United States Patent
Izadian et al.

(10) Patent No.: US 10,082,570 B1
(45) Date of Patent: Sep. 25, 2018

(54) INTEGRATED MIMO AND SAR RADAR ANTENNA ARCHITECTURE FOR SELF DRIVING CARS

(71) Applicant: Waymo LLC, Mountain View, CA (US)

(72) Inventors: Jamal Izadian, Mountain View, CA (US); Russell Smith, Mountain View, CA (US); Tim Campbell, Mountain View, CA (US); Adam Brown, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 408 days.

(21) Appl. No.: 15/054,540

(22) Filed: Feb. 26, 2016

(51) Int. Cl.
| | |
|---|---|
| *G01S 13/86* | (2006.01) |
| *G01S 13/90* | (2006.01) |
| *G01S 13/93* | (2006.01) |
| *H01Q 21/00* | (2006.01) |
| *H01Q 1/32* | (2006.01) |

(52) U.S. Cl.
CPC ............. *G01S 13/86* (2013.01); *G01S 13/90* (2013.01); *G01S 13/931* (2013.01); *H01Q 1/3233* (2013.01); *H01Q 21/0037* (2013.01)

(58) Field of Classification Search
CPC ........ G01S 13/86; G01S 13/90; G01S 13/931; H01Q 21/00; H01Q 21/0037; H01Q 21/0043; H01Q 21/005; H01Q 21/0068
See application file for complete search history.

(56) References Cited

U.S. PATENT DOCUMENTS

| | | | | |
|---|---|---|---|---|
| 4,742,355 A | * | 5/1988 | Wolfson | H01P 11/002 29/600 |
| 6,642,908 B2 | * | 11/2003 | Pleva | B60K 31/0008 343/700 MS |
| 7,202,832 B2 | * | 4/2007 | Wang | H01Q 1/3275 343/711 |
| 8,797,208 B2 | * | 8/2014 | Stirling-Gallacher | G01S 13/34 342/179 |
| 9,178,258 B1 | * | 11/2015 | Brown | H01P 3/12 |
| 9,274,525 B1 | * | 3/2016 | Ferguson | G05D 1/0274 |
| 9,395,727 B1 | * | 7/2016 | Smith | G05D 1/0257 |
| 9,472,853 B1 | * | 10/2016 | Smith | H01Q 13/02 |
| 2004/0090290 A1 | * | 5/2004 | Teshirogi | H01Q 13/22 333/237 |
| 2005/0146479 A1 | * | 7/2005 | Stenger | H01P 1/047 343/772 |

(Continued)

*Primary Examiner* — Peter M Bythrow
(74) *Attorney, Agent, or Firm* — McDonnell Boehnen Hulbert & Berghoff LLP

(57) ABSTRACT

A radar system includes a split-block assembly unit comprising a first portion and second portion, where the first portion and the second portion form a seam. The radar system further includes a plurality of ports located on a bottom side of the second portion opposite the seam. Additionally, the radar system includes a plurality of radiating elements located on a top side of the first portion opposite the seam. The plurality of radiating elements is arranged in a plurality of arrays. The plurality of arrays includes a set of multiple-input multiple-output (MIMO) transmission arrays, a set of synthetic aperture radar (SAR) transmission arrays, and at least one reception array. Further, the radar system includes a set of waveguides configured to couple each array to a port.

20 Claims, 17 Drawing Sheets

(56) References Cited

U.S. PATENT DOCUMENTS

| | | | |
|---|---|---|---|
| 2006/0164315 A1* | 7/2006 | Munk | H01Q 21/005 343/776 |
| 2009/0121952 A1* | 5/2009 | Shibuya | H01P 5/022 343/767 |
| 2010/0060537 A1* | 3/2010 | Nagayama | H01Q 1/247 343/776 |
| 2010/0085263 A1* | 4/2010 | Yano | H01Q 13/22 343/771 |
| 2011/0248884 A1* | 10/2011 | Yano | H01Q 1/42 342/175 |
| 2012/0146844 A1* | 6/2012 | Stirling-Gallacher | G01S 13/34 342/189 |
| 2013/0120205 A1* | 5/2013 | Thomson | H01Q 21/0075 343/776 |
| 2013/0120206 A1* | 5/2013 | Biancotto | H01Q 21/005 343/776 |
| 2013/0234904 A1* | 9/2013 | Blech | H01Q 13/06 343/776 |
| 2013/0321229 A1* | 12/2013 | Klefenz | H01Q 21/0087 343/770 |
| 2014/0055312 A1* | 2/2014 | Guler | H01Q 13/02 343/785 |
| 2014/0240186 A1* | 8/2014 | Zhou | H01Q 13/06 343/772 |
| 2015/0009081 A1* | 1/2015 | Hulsmann | G01S 7/03 343/753 |

* cited by examiner

INTEGRATED MIMO AND SAR RADAR ANTENNA ARCHITECTURE FOR SELF DRIVING CARS

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals. Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be identified and/or mapped. The radar sensor can thus be used, for instance, by an autonomous vehicle control system to avoid obstacles indicated by the sensor information.

Some example automotive radar systems may be configured to operate at an electromagnetic wave frequency of 77 Giga-Hertz (GHz), which corresponds to millimeter (mm) electromagnetic wave length (e.g., 3.9 mm for 77 GHz). These radar systems may use antennas that can focus the radiated energy into beams in order to enable the radar system to measure an environment with high accuracy, such as an environment around an autonomous vehicle. Such antennas may be compact (typically with rectangular form factors; e.g., 1.3 inches high by 2.5 inches wide), efficient (i.e., there should be little 77 GHz energy lost to heat in the antenna, or reflected back into the transmitter electronics), and cheap and easy to manufacture.

In some scenarios, efficiency may be difficult to balance with cheap and easy manufacture. Some cheap and easy to manufacture options may involve integrating an antenna into a circuit board (e.g., with a "series-fed patch array"), which is used by many off-the-shelf automotive radars. However, such antennas may lose much of their energy into heating up the substrate of the circuit board. Antennas with the lowest loss may include all-metal designs, but typical all-metal antennas, such as slotted waveguide arrays, can be difficult to manufacture with the small geometries compatible with 77 GHz operation.

SUMMARY

In one aspect, the present application describes a radar system. The radar system includes a split-block assembly having a first portion and second portion. The first portion and the second portion form a seam, where the first portion has a top side opposite the seam and the second portion has a bottom side opposite the seam. The radar system also includes a plurality of ports located on a bottom side of the second portion. The radar system further includes a plurality of radiating elements located on a top side of the first portion. The plurality of radiating elements is arranged in a plurality of arrays. The plurality of arrays include a set of multiple-input multiple-output (MIMO) transmission arrays, a set of synthetic aperture radar (SAR) transmission arrays, and at least one reception array. Additionally, the radar system includes a set of waveguides in the split-block assembly configured to couple each array to a port.

In another aspect, the present application describes an antenna configuration for a vehicle-mounted radar system. The antenna configuration includes four multiple-output (MIMO) transmission antenna arrays, each MIMO array configured as a six by ten array. The antenna configuration also includes four synthetic aperture radar (SAR) arrays transmission antenna arrays, each SAR array configured as a six by ten array. Further, the antenna configuration includes a SAR reception array configured as a six by ten array. Additionally, the antenna unit includes a uniform linear array configured as a sixteen by ten array.

In yet another aspect, the present application describes a vehicle-mounted radar system. The vehicle-mounted radar system includes four multiple-output (MIMO) transmission antenna arrays, each MIMO array configured having a broadside beam width of approximately 90 degrees. The vehicle-mounted radar system further includes four synthetic aperture radar arrays (SAR) transmission antenna arrays, each SAR array having a beam width of approximately 45 degrees pointed at an angle of 22.5 degrees. Additionally, the vehicle-mounted radar system includes a SAR reception array configured having an electronically steerable beam. Also, the vehicle-mounted radar system includes a uniform linear array configured having an electronically steerable beam.

Additionally, the SAR and MIMO antennas may be strategically staggered in elevation, as well as in azimuth, to allow SAR and MIMO operation modes to capture three-dimensional data. Furthermore, in one example, the positioning (i.e. angular pointing and the beamwidths) of the radar units are designed to allow the use of at least four such radars at the four corners of a vehicle of a pointed in a manner to provide full 360 degree radar coverage.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
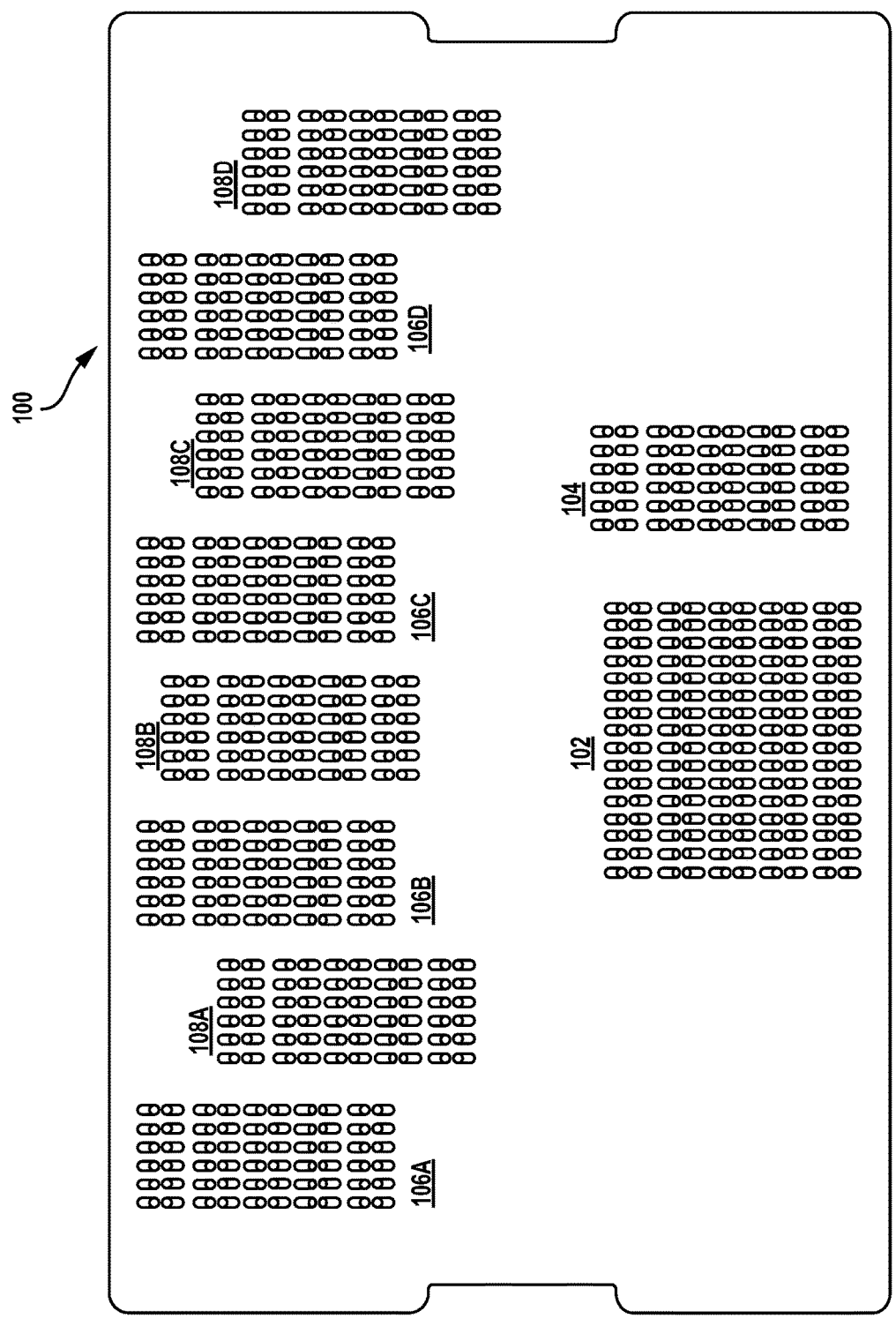
FIG. 1 illustrates an integrated MIMO and SAR radar antenna architecture.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description discloses an apparatus having an integrated MIMO and SAR radar antenna architecture. The MIMO and SAR radar antenna architecture may include a plurality of "dual open-ended waveguide" (DOEWG) antennas. In some examples, the term "DOEWG" may refer herein to a short section of a horizontal waveguide channel plus a vertical channel that splits into two parts, where each of the two parts of the vertical channel includes an output port configured to radiate at least a portion of electromagnetic waves that enter the antenna. Additionally, a plurality of DOEWG antennas may be arranged into an antenna array. The MIMO and SAR radar antenna architecture described herein may include a plurality of antenna arrays.

An example antenna architecture may comprise, for example, two metal layers (e.g., aluminum plates) that can be machined with computer numerical control (CNC), aligned properly, and joined together. The first metal layer may include a first half of an input waveguide channel, where the first half of the first waveguide channel includes an input port that may be configured to receive electromagnetic waves (e.g., 77 GHz millimeter waves) into the first waveguide channel. The first metal layer may also include a first half of a plurality of wave-dividing channels. The plurality of wave-dividing channels may comprise a network of channels that branch out from the input waveguide channel and that may be configured to receive the electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels. The two metal layers may be assembled together to form a split-block assembly.

In various examples, the power dividing elements of the antenna architecture may be a three-dimensional dividing network of waveguides. The three-dimensional dividing network of waveguides may use waveguide geometry to divide power. For example, the feed waveguides may have a predetermined height and width. The predetermined height and width may be based on a frequency of operation of the radar unit. The three-dimensional dividing network may include waveguides that differ in height and/or width from the predetermined height and width of the feed waveguides in order to achieve a desired taper profile.

In the present disclosure, feed waveguides that provide a signal to radiating elements may be divided between the top and bottom portions of the split-block assembly. Further, the feed waveguides may all be located in a common plane where the midpoint of the height of feed waveguides is common for all of the feed waveguides. The three-dimensional dividing network of waveguides may be located partly in the same plane as the feed waveguides and partly in at least one other plane. For example, the entire height of a portion of the three-dimensional dividing network of waveguides may be machined into either the first or second portion of the split-block assembly. When the two block pieces are brought together, a surface of the other block portion may form an edge of the portion or the three-dimensional dividing network of waveguides that has its height fully in one of the two block sections. In some examples, the vertical portion of these waveguide cavities and cuts are symmetric with respect to the split block seam.

In another example, the power dividing elements may be a two-dimensional dividing network of waveguides. The two-dimensional dividing network of waveguides may use waveguide geometry to divide power. For example, the feed waveguides may have a predetermined height and width. The predetermined height and width may be based on a frequency of operation of radar unit. The two-dimensional dividing network may include waveguides that differ in width from the predetermined width of the feed waveguides in order to achieve the desired taper profile. Thus, the dividing network may have a geometry that is varied compared to the feed waveguide geometry.

In the present disclosure, the feed waveguides may be divided between the top and bottom portions of the split-block assembly. Further, the feed waveguides and the two-dimensional dividing network may all be located in a common plane where the midpoint of the height of feed waveguides is common for all of the feed waveguides. When the two block pieces are brought together, the two half-height waveguide portions may couple and form a full-height waveguide.

In yet another example, the power dividing elements may be a three-dimensional dividing network of waveguides. The three-dimensional dividing network of waveguides may form hybrid couplers to divide the electromagnetic energy. In practice, the three-dimensional dividing network may include waveguides that have a portion of the length of a respective waveguide adjacent to the length of a portion of another waveguide. The waveguides may have adjacent short walls. The two waveguides may be separated by a thin metal sheet. A coupling aperture may be formed based on cutouts, holes, or spaces in the thin metal sheet to allow electromagnetic energy to couple from one waveguide to the adjacent waveguide.

Additionally, in a region that forms a short wall hybrid coupler, a full-height waveguide may be formed in a top block portion and a full-height waveguide may be formed in a bottom block portion. A thin metal layer may be located at the seam between the two block portions to form both an edge of the respective waveguide of the dividing network and a coupling aperture. Holes, cuts, perforations, or areas without the thin metal layer may form the aperture by which electromagnetic energy may couple from one waveguide of the dividing network to another waveguide of the dividing network.

Both the three-dimensional dividing network of waveguides and the two-dimensional dividing network of waveguides presented herein allows a power dividing beamforming network to be constructed to be more compact (i.e. fit in a smaller volume) than traditional beamforming networks. Further, the three-dimensional dividing network and the two-dimensional dividing network of waveguides presented herein may be constructed with reactive components. In practice, a reactive beam forming network may avoid use of absorbing load elements. The use of reactive elements without absorbing load elements may enable the radar system to operate more efficiently. In some examples, the antenna system presented herein may be a fully reactive system and not use any absorption components.

Further, the first metal layer may include a first half of the plurality of wave-radiating channels, where respective wave-radiating channels may be configured to receive the respective portions of electromagnetic waves from the wave-dividing channels, and where first halves of the respective wave-radiating channels include at least one wave-directing member configured to propagate sub-portions of electromagnetic waves to another metal layer.

Moreover, the second metal layer may include second halves of the input waveguide channel, the plurality of wave-dividing channels, and the plurality of wave-radiating channels. The second halves of the respective wave-radiating channels may include at least one pair of output ports partially aligned with the at least one wave-directing member and configured to radiate the sub-portions of electromagnetic waves propagated from the at least one wave-directing member out of the second metal layer. More particularly, a combination of a given wave-directing member with a corresponding pair of output ports may take the form of (and may be referred to herein as) a DOEWG, as described above.

Furthermore, while in this particular example, as well as in other examples described herein, the antenna apparatus may be comprised of two metal layers, it should be understood that in still other examples, one or more of the channels described above may be formed into a single metal layer, or into more than two metal layers that make up the antenna. Still further, within examples herein, the concept of electromagnetic waves (or portions/sub-portions thereof) propagating from one layer of the antenna architecture to another layer is described for the purpose of illustrating functions of certain components of the antenna, such as the wave-directing members. In reality, electromagnetic waves may not be confined to any particular "half" of a channel during certain points of their propagation through the antenna. Rather, at these certain points, the electromagnetic waves may propagate freely through both halves of a given channel when the halves are combined to form the given channel.

In some embodiments discussed herein, the two metal layers may be joined directly, without the use of adhesives, dielectrics, or other materials, and without methods such as soldering, diffusion bonding, etc. that can be used to join two metal layers. For example, the two metal layers may be joined by making the two layers in physical contact without any further means of coupling the layers.

In some examples, the present disclosure provides an integrated power divider and method by which each waveguide that feeds a plurality of radiating doublets of a DOEWG may have its associated amplitude adjusted. The amplitude may be adjusted based on a pre-defined taper profile. Additionally, the present DOEWG may be implemented without complicated manufacturing process. For example, a Computerized Numerical Control (CNC) machining process may be implemented to make the above-described adjustments in parameters such as height, depth, multiplicity of step-up or step-down phase adjustment components, etc. Yet further, the present disclosure may enable a much more accurate method of synthesizing a desired amplitude and phase to cause a realized gain, sidelobe levels, and beam pointing for the antenna apparatus, as compared to other types of designs.

The disclosed antenna architecture provides a multifunctional radar capability. In some examples, the antenna architecture enables at least 64 channel MIMO transmission and reception. This MIMO antenna architecture may enable diversity in azimuth and elevation to pinpoint objects in the driving scene. In one example, the MIMO antenna architecture may provide improvements enable the radar system to identify bridges and cars on or under bridges. Typical vehicular radar systems have trouble identify other vehicles near metallic bridges.

The disclosed antenna architecture includes both SAR and MIMO capabilities that are provided by the 4 SAR transmission antennas, and a dedicated SAR reception antenna in combination with a 4 MIMO transmission antennas and shared uniform linear array.

Referring now to the figures, FIG. 1 illustrates an integrated MIMO and SAR radar antenna architecture. It should be understood that other layouts and arrangements of the various elements are possible as well. For examples, it should also be understood that a given application of such an antenna may determine appropriate dimensions and sizes for various machined portions of the two metal layers described above (e.g., channel size, metal layer thickness, etc.) and/or for other machined (or non-machined) portions/components of the antenna described herein. For instance, as discussed above, some example radar systems may be configured to operate at an electromagnetic wave frequency of 77 GHz, which corresponds to millimeter electromagnetic wave length. At this frequency, the channels, ports, etc. of an apparatus may be of given dimensions appropriated for the 77 GHz frequency. Other example antennas and antenna applications are possible as well.

The radar antenna architecture 100 may be a top view of a split-block construction antenna unit. FIG. 1 shows a view of the top surface of a top block. The top surface of the block contains a plurality of antenna apertures. In the example radar antenna architecture 100, the antenna apertures may be arranged in a plurality of arrays. In various other examples, the size, shape, location, and function of the various arrays may be different than that shown in FIG. 1.

The example radar antenna architecture 100 includes a uniform linear array 102 for receiving radar signals. The uniform linear array 102 may be configured as a sixteen by ten array of antenna elements. The example radar antenna architecture 100 also includes a SAR reception array 104. The SAR reception array 104 may be configured as a six by ten array of antenna elements. The example radar antenna architecture 100 also includes four MIMO transmission antenna arrays 106A-106D. Each MIMO array may be configured as a six by ten array. Further, the example radar antenna architecture 100 includes four SAR transmission antenna arrays 108A-108D, each SAR array configured as a six by ten array.

During the operation of the radar system, each MIMO transmission array 106A-106D of the example radar antenna architecture 100 may have a beam width of approximately 90 degrees and each SAR transmission array 108A-108D of the example radar antenna architecture 100 may have a beam width of approximately 45 degrees. Both the uniform linear array 102 and the SAR reception array 104 may have a beam that is electronically steerable. In some examples the uniform linear array 102 and the SAR reception array 104 may be able to scan their respective beams over 22.5, 45, or 90 degrees. In some examples each SAR transmission array 108A-108D may be pointed at an angle of 22.5 degrees. Additionally, in an example embodiment, the DOEWG array may have a width of about 148 mm and a length of about 93 mm.

By including the various antenna arrays, the example radar antenna architecture 100 may function both in a MIMO and a SAR mode. To operate in a SAR mode, a radar system of the vehicle may transmit and receive multiple radar pulses. The radar pulses may be transmitted and received while the vehicle is in motion. Thus, the radar pulses may be transmitted and received from different locations. A SAR radar system provides advantages of traditional scanning radar systems due to the transmitting and receiving being performed at multiple locations. The radar system may simultaneously (or in parallel) process several received signals. Each received signal may contain information about a variety of radar targets within a field of view of the radar system. Because the signals were transmitted and received from different locations, each received signal may contain different information about the variety of radar targets due to the signals being reflected from the target objects at different angles relative to the radar unit of the vehicle. By receiving the signals from different angles, the radar system may have a higher resolution than traditional scanning radar systems.

In some examples, the radar system may be configured to interrogate (i.e. transmit radar signals) in a direction normal to the direction of travel of the vehicle via the SAR radar functionality. Thus, the radar system may be able to determine information about roadside object along which the vehicle passes. In some examples, this information may be two dimensional (e.g. distances various objects are from the roadside). In other examples, this information may be three dimensional (e.g. a point cloud of various portions of detected objects). Thus, the vehicle may be able to "map" the side of the road as it drives along.

To operate in a MIMO mode, a radar system of the vehicle may transmit and receive multiple radar pulses. The radar pulses may be transmitted and received from a plurality of different antenna apertures (e.g. antenna arrays). The term MIMO comes from a radar system having multiple inputs and multiple outputs. It may be desirable for each of the multiple input antennas and each of the multiple output antennas to operate uncoupled (that is receive a separate diverse signal) from each other respective input and output antenna. A radar may have MIMO capabilities in multiple ways. First, spatial diversity (i.e. a difference between physical location) of radar transmitters (and/or receivers) may enable MIMO functionality. Second, coding diversity may enable a radar system to transmit a signal that has a respective coding. The coding may include multiple signals that are orthogonal to each other so virtual diverse channels can be created. In some system, a combination of spatial diversity and coding diversity may be used to establish the MIMO diversity. Yet, additionally, time division multiple access (TDMA) can provide time diversity to allow multiple transmission and reception antennas to be used. Also, in other examples, a frequency division multiple access (FDMA) may also be used for diversity.

Figure 2:
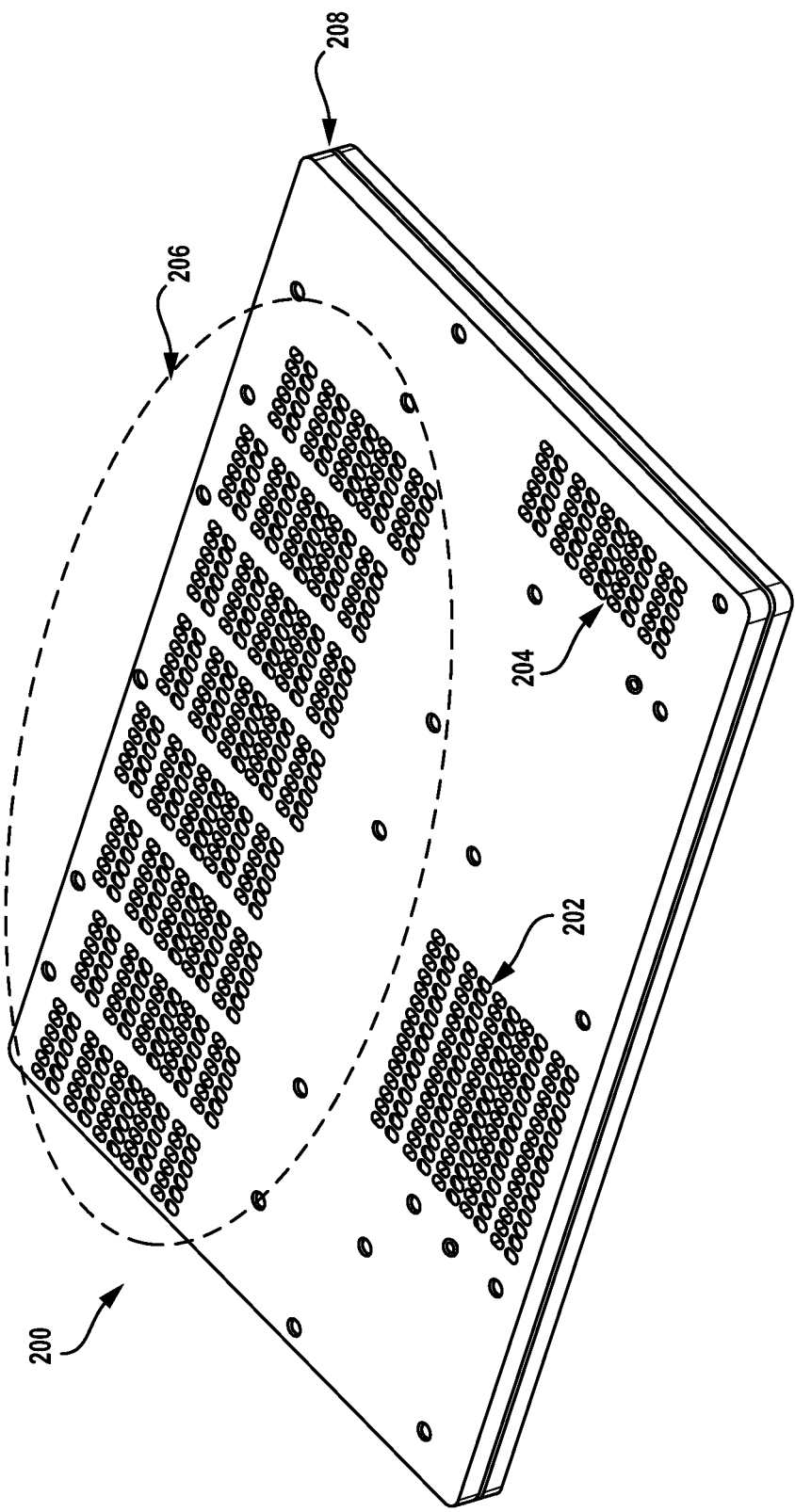
FIG. 2 illustrates another view of an integrated MIMO and SAR radar antenna architecture.

FIG. 2 illustrates another view of an integrated MIMO and SAR radar antenna architecture 200. FIG. 2 shows a three dimensional view of the split-block assembly. Similar to FIG. 1, the top surface of the block contains a plurality of antenna apertures. In the example radar antenna architecture 200, the antenna apertures may be arranged in a plurality of arrays. In various other examples, the size, shape, location, and function of the various arrays may be different than that shown in FIG. 2.

Again, similar to FIG. 1, the example radar antenna architecture 200 includes a uniform linear array 202 for receiving radar signals. The uniform linear array 202 may be configured as a sixteen by ten array of antenna elements. The uniform linear array 202 may be configured to receive radar signals when the radar unit is operating in either the SAR or the MIMO mode. The example radar antenna architecture 200 also includes a SAR reception array 204. The SAR reception array 204 may be configured as a six by ten array of antenna elements. The example radar antenna architecture 200 also includes four MIMO transmission antenna arrays and four SAR transmission antenna arrays located in the transmission section 206. Each transmission array may be configured as a six by ten array.

The radar antenna architecture 200 also shows the seam 208. The seam 208 is a position where the top portion of the split-block assembly and the bottom portion of the split-block assembly come together to form a seam.

Figure 3:
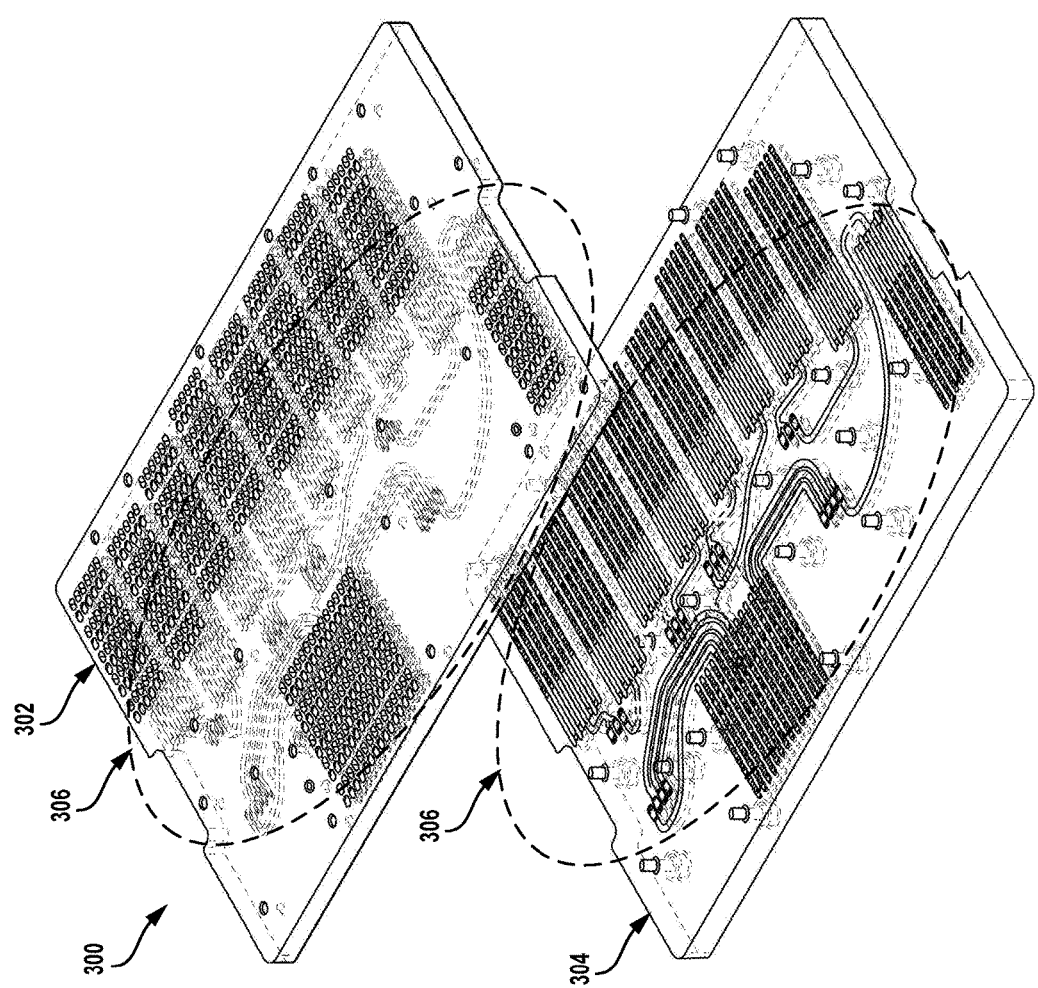
FIG. 3 illustrates an expanded view of an integrated MIMO and SAR radar antenna architecture.

FIG. 3 illustrates an expanded view of an integrated MIMO and SAR radar antenna architecture 300. As shown in FIG. 3, a top portion 302 and a bottom portion 304 of the split-block assembly are separated. And, shown as dotted lines in both the top portion 302 and the bottom portion 304 are a series of waveguides 306. The waveguides 306 couple the radiating elements to coupling structures outside of the radar antenna architecture 300. The coupling structures are configured to either inject electromagnetic energy into the radar antenna architecture 300 for transmission by the antennas of the arrays or remove electromagnetic energy from the radar antenna architecture 300 received by the antennas of the arrays. In some examples, a portion of each waveguide lies in both the top portion 302 and the bottom portion 304. In this example, when the top portion 302 and the bottom portion 304 are coupled together, the waveguide is formed. The waveguides 306 will be discussed further with respect to other figures.

Figure 4:
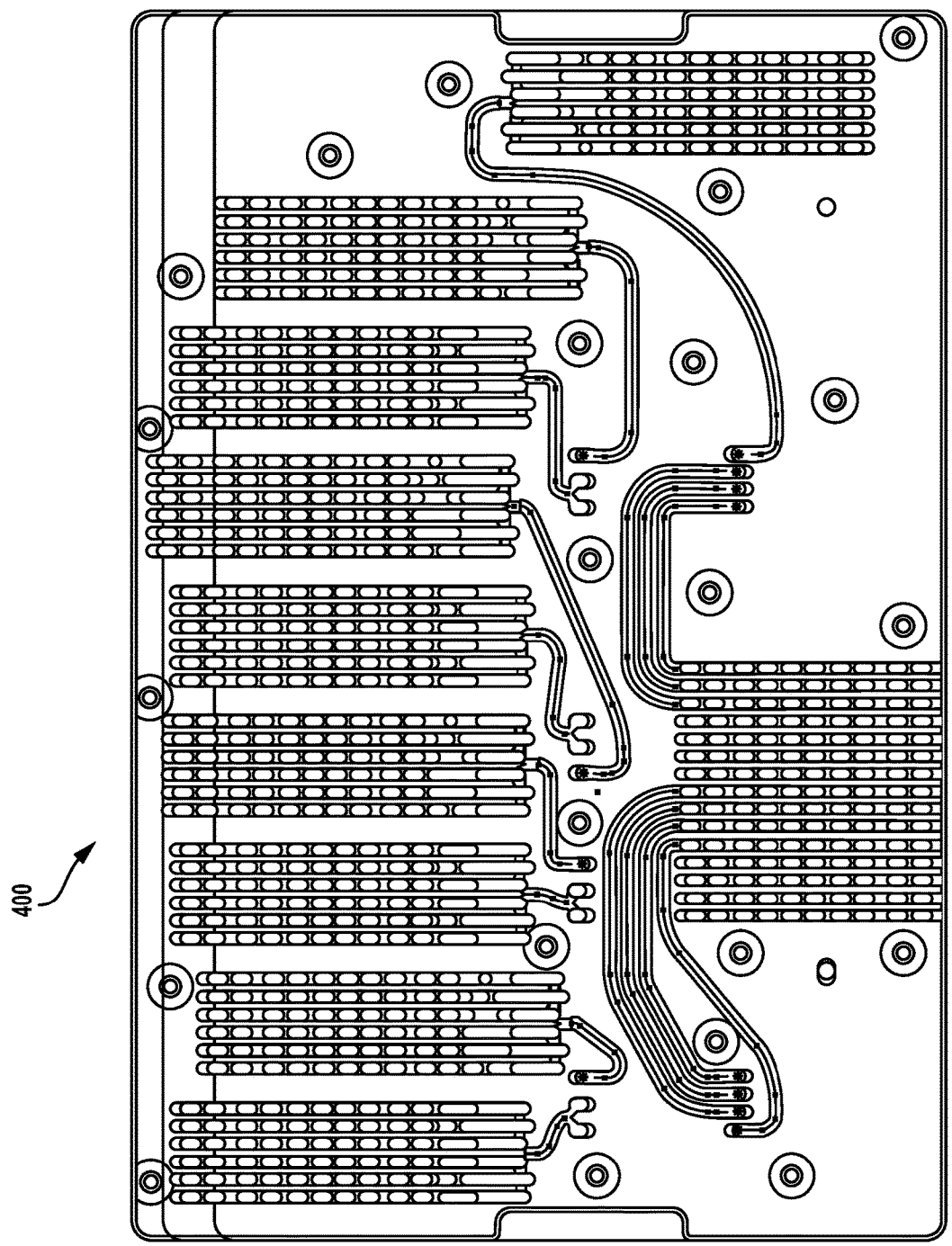
FIG. 4 illustrates an internal view of an integrated MIMO and SAR radar antenna architecture.

FIG. 4 illustrates an internal view of an integrated MIMO and SAR radar antenna architecture 400. The radar antenna architecture 400 shows an example layout of ports, waveguides, and radiating structures for use with the disclosed radar systems. The waveguides of FIGS. 3 and 4 may be configured to perform both power splitting and beamforming. The power splitting and beam forming may be provided by the waveguides based on the description of the waveguides in the remaining figures.

Figure 5A:
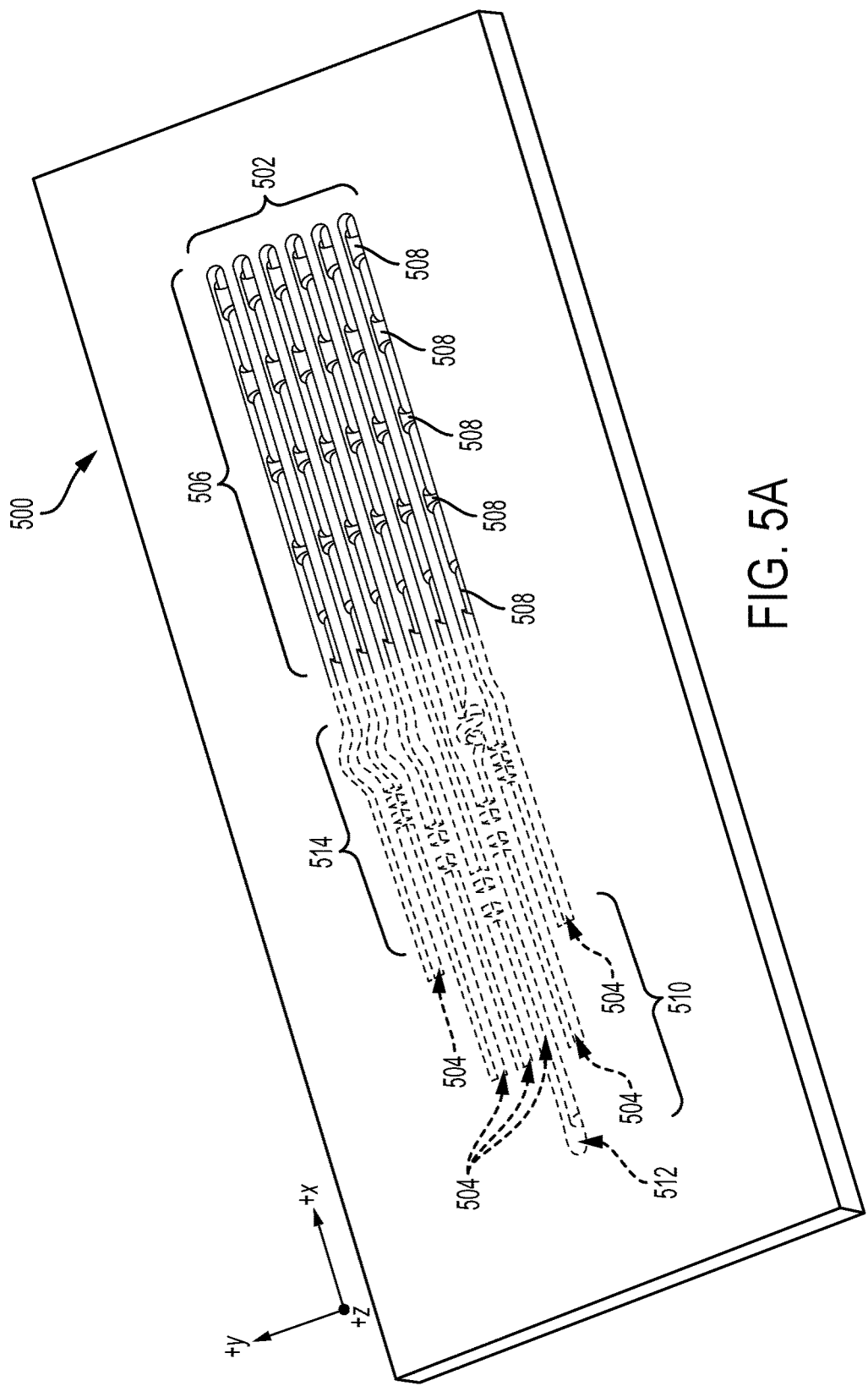
FIG. 5A illustrates a first layer of an example antenna, in accordance with an example embodiment.
Figure 5B:
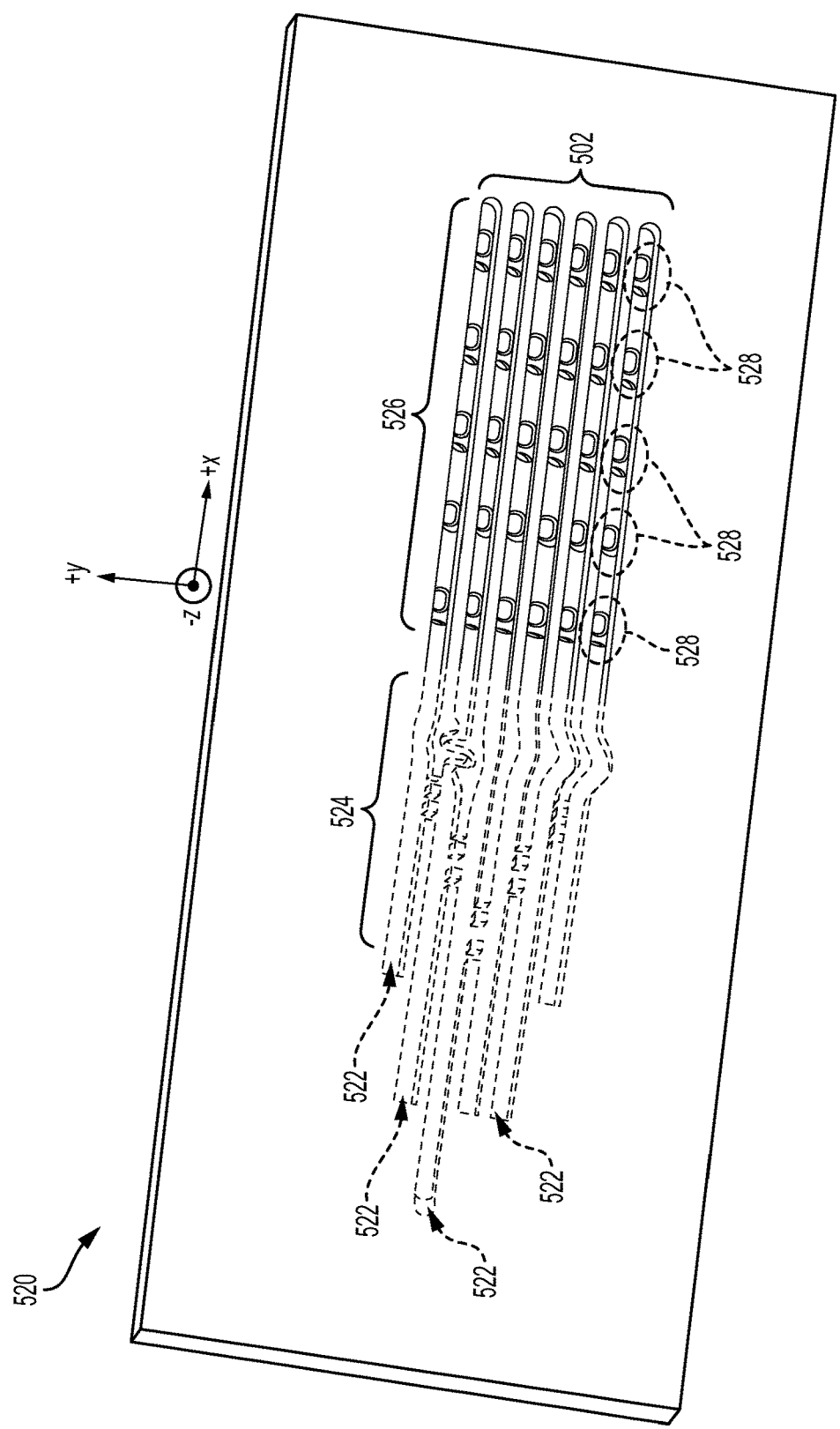
FIG. 5B illustrates a second layer of an example antenna, in accordance with an example embodiment.
Figure 5C:
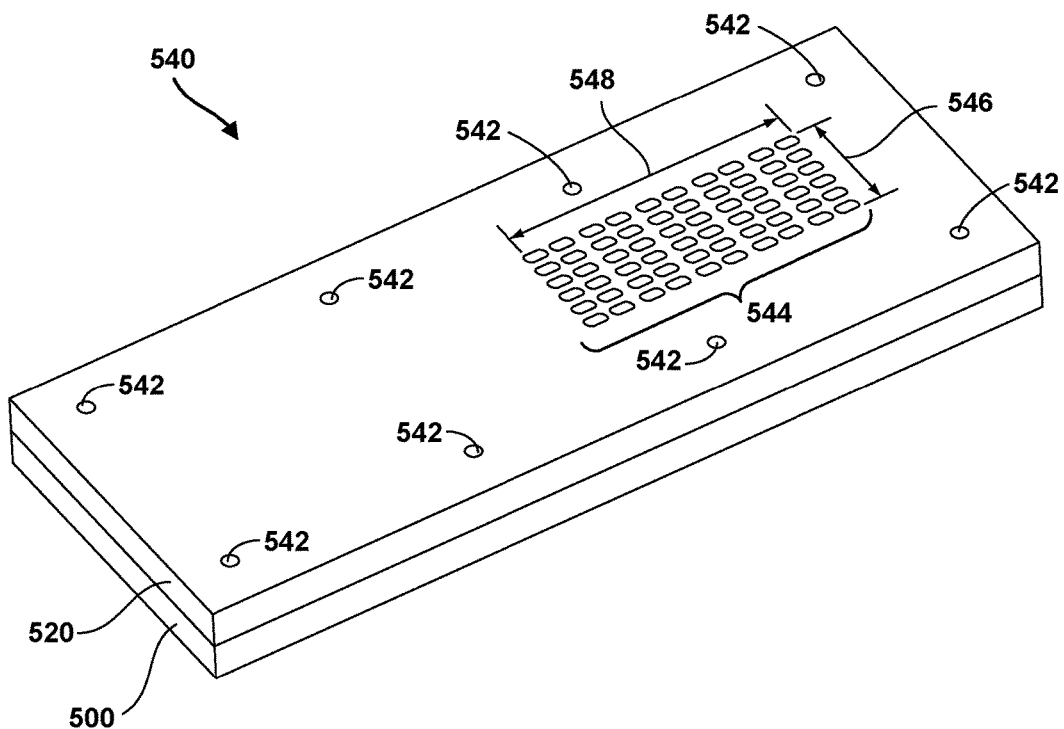
FIG. 5C illustrates an assembled views of an example antenna, in accordance with an example embodiment
Figure 5D:
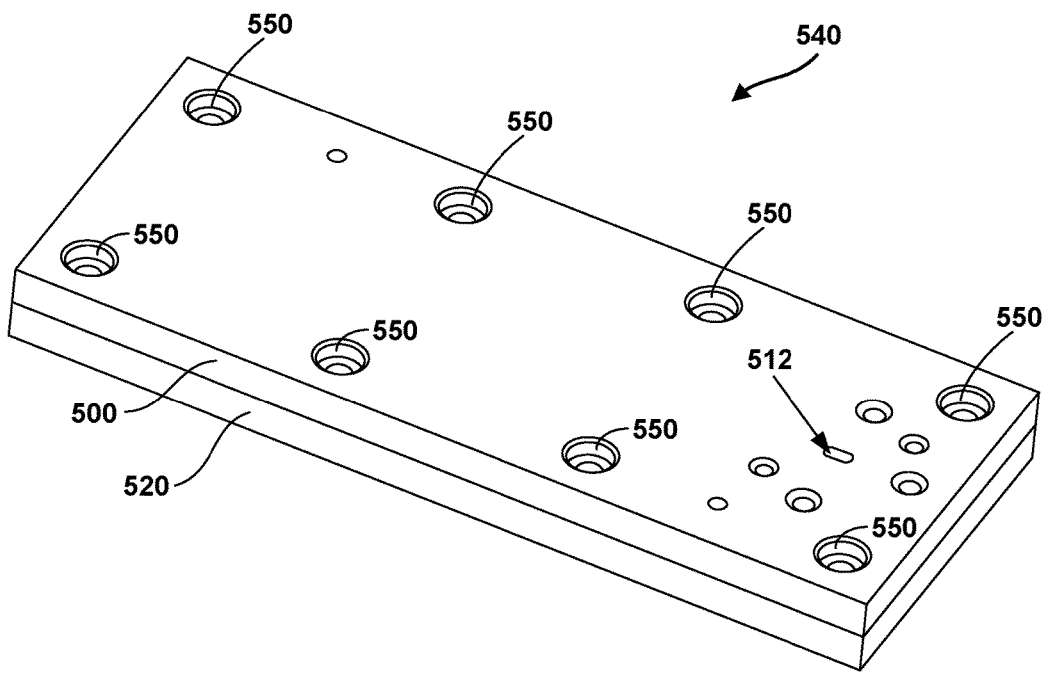
FIG. 5D illustrates an assembled views of an example antenna, in accordance with an example embodiment.
Figure 5E:
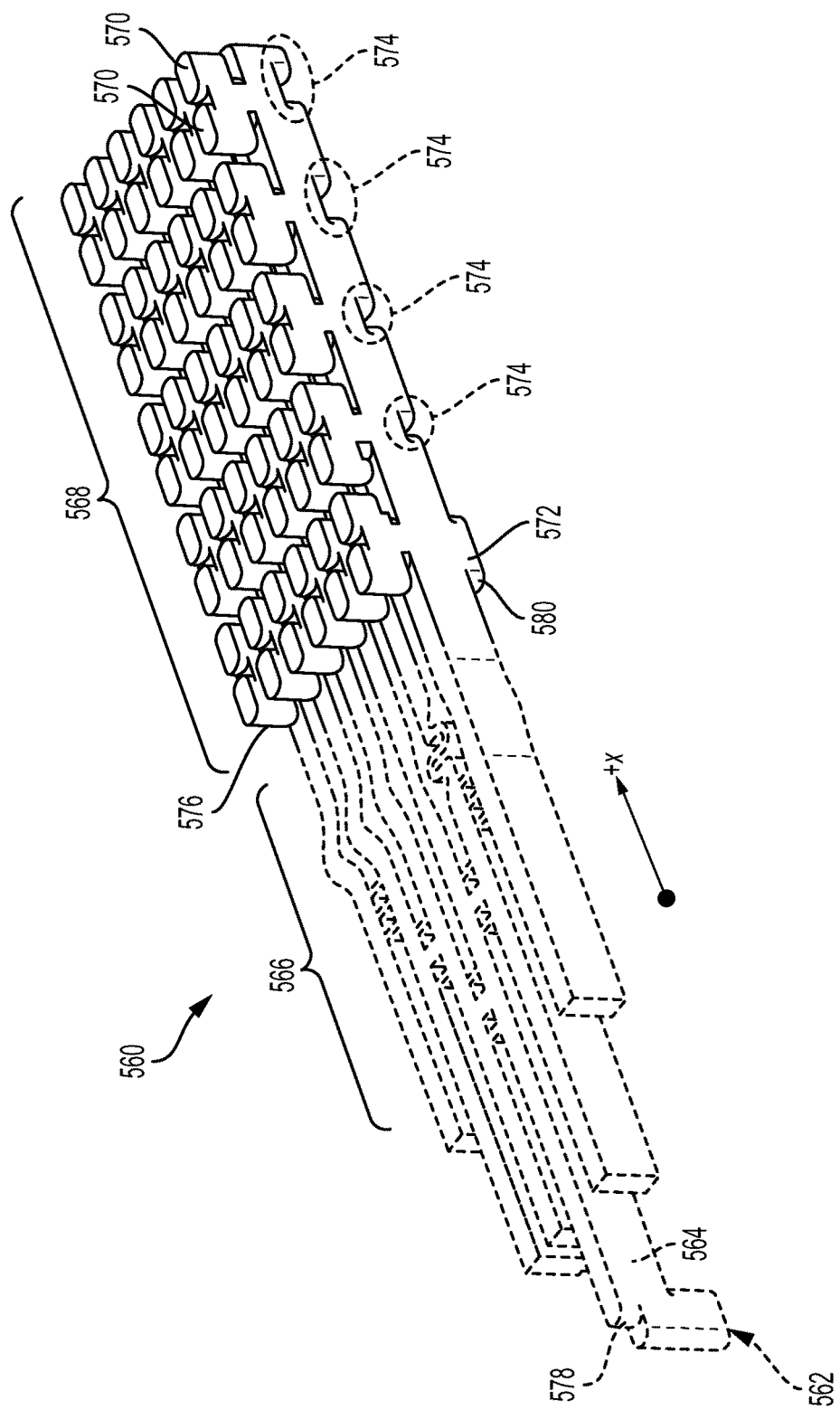
FIG. 5E illustrates conceptual waveguide channels formed inside an assembled example antenna, in accordance with an example embodiment.

Some components illustrated in of FIGS. 5A, 5B, and 5E are shown using broken lines, including elongated segments 504, second end 510, and power dividers 514. The components shown in broken lines are described herein with respect to the alignments shown in the respective figures. However, these components may have altered geometries and/or locations within the context of the disclosure. For example, the presently discussed waveguide dividing networks as disclosed herein may replace a portion of the broken line components of FIGS. 5A, 5B, and 5E. Further, the geometries of the waveguides of FIG. 5A-E are for explanation purposes of the waveguides functionality.

FIG. 5A illustrates an example first metal layer 500 including a first half of a plurality of waveguide channels 502. These waveguide channels 502 may comprise multiple elongated segments 504. At a first end 506 of each elongated segment 504 may be a plurality of collinear wave-directing members 508, each with sizes similar or different from other wave-directing members. In line with the description above, the first ends 506 of the elongated segments 504 may be referred to herein as a first half of wave-radiating channels.

At a second end 510 of the channels 502 opposite the first end 506, one of the elongated segments 504 may include a through-hole 512 (i.e., input port). A given amount of power may be used to feed a corresponding amount of electromagnetic waves (i.e., energy) into the apparatus, and the through-hole 512 may be the location where these waves are fed into the apparatus. In line with the description above, the single channel/segment of the waveguide channels 502 that includes the input port may be referred to herein as an input waveguide channel.

Upon entering the apparatus, the electromagnetic waves may generally travel in the +x direction, as shown, towards an array of power dividers 514 (i.e., a "beam-forming network"). The array 514 may function to divide up the electromagnetic waves and propagate respective portions of the waves to respective first ends 506 of each elongated segment 504. More specifically, the waves may continue to propagate in the +x direction after leaving the array 514 toward the wave-directing members 508. In line with the description above, the array 514 section of the waveguide channels may be referred to herein as wave-dividing channels.

As the portions of the electromagnetic waves reach the wave-directing members 508 at the first end 506 of each elongated segment 504 of the waveguide channels 502, the wave-directing members 508 may propagate through respective sub-portions of the electromagnetic energy to a second half of the waveguide channels (i.e., in the +z direction, as shown). For instance, the electromagnetic energy may first reach a wave-directing member that is recessed, or machined further into the first metal layer 500 (i.e., a pocket). That recessed member may be configured to propagate a smaller fraction of the electromagnetic energy than each of the subsequent members further down the first end 506, which may be protruding members rather than recessed members. Further, each subsequent member may be configured to propagate a greater fraction of the electromagnetic waves travelling down that particular elongated segment 504 at the first end 506 than the member that came before it. As such, the member at the far end of the first end 506 may be configured to propagate the highest fraction of electromagnetic waves. Each wave-directing member 508 may take various shapes with various dimensions. In other examples, more than one member (or none of the members) may be recessed. Still other examples are possible as well. In addition, varying quantities of elongated segments are possible.

A second metal layer may contain a second half of the one or more waveguide channels, where respective portions of the second half of the one or more waveguide channels include an elongated segment substantially aligned with the elongated segment of the first half of the one or more waveguide channels and, at an end of the elongated segment, at least one pair of through-holes partially aligned with the at least one wave-directing member and configured to radiate electromagnetic waves propagated from the at least one wave-directing member out of the second metal layer.

Within examples, the elongated segment of the second half may be considered to substantially align with the elongated segment of the first half when the two segments are within a threshold distance, or when centers of the segments are within a threshold distance. For instance, if the centers of the two segments are within about ±0.051 mm of each other, the segment may be considered to be substantially aligned.

In another example, when the two halves are combined (i.e., when the two metal layers are joined together), edges of the segments may be considered to be substantially aligned if an edge of the first half of a segment and a corresponding edge of the second half of the segment are within about ±0.051 mm of each other.

In still other examples, when joining the two metal layers, one layer may be angled with respect to the other layer such that their sides are not flush with one another. In such other examples, the two metal layers, and thus the two halves of the segments, may be considered to be substantially aligned when this angle offset is less than about 0.5 degrees.

In some embodiments, the at least one pair of through-holes may be perpendicular to the elongated segments of the second half of the one or more waveguide channels. Further, respective pairs of the at least one pair of through-holes may include a first portion and a second portion. As such, a given pair of through-holes may meet at the first portion to form a single channel. That single channel may be configured to receive at least the portion of electromagnetic waves that was propagated by a corresponding wave-directing member and propagate at least a portion of electromagnetic waves to the second portion. Still further, the second portion may include two output ports configured as a doublet and may be configured to receive at least the portion of electromagnetic waves from the first portion of the pair of through-holes and propagate at least that portion of electromagnetic waves out of the two output ports.

FIG. 5B illustrates the second metal layer 520 described above. The second metal layer 520 may include a second half of the plurality of waveguide channels 502 of the first metal layer 500 shown in FIG. 5A (i.e., a second half of the input waveguide channel, the wave-dividing channels, and the wave-radiating channels). As shown, the second half of the waveguide channels 502 may take on the general form of the first half of the channels, so as to facilitate proper alignment of the two halves of the channels. The elongated segments of the second half 522 may include second halves of the array of power dividers 524. As described above, electromagnetic waves may travel through the array 524, where they are divided into portions, and the portions then travel (i.e., in the +x direction, as shown) to respective ends 526 of the second halves of the elongated segments 522. Further, an end 526 of a given elongated segment may include multiple pairs of through-holes 528, which may be at least partially aligned with the wave-directing members 508 of the first metal layer 500. More specifically, each pair of through-holes may be at least partially aligned with a corresponding wave-directing member, also referred to as a reflecting element, such that when a given sub-portion of electromagnetic waves are propagated from the first metal layer 500 to the second metal layer 520, as described above, those sub-portions are then radiated out of the pair of through-holes (i.e., a pair of output ports) in the −z direction, as shown. Again, the combination of a given wave-directing member and a corresponding pair of output ports may form a DOEWG, as described above.

Moreover, a combination of all the DOEWGs may be referred to herein as a DOEWG array. In antenna theory, when an antenna has a larger radiating aperture (i.e., how much surface area of the antenna radiates, where the surface area includes the DOEWG array) that antenna may have higher gain (dB) and a narrower beam width. As such, in some embodiments, a higher-gain antenna may include more channels (i.e., elongated segments), with more DOEWGs per channel. While the example antenna illustrated in FIGS. 5A and 5B may be suitable for autonomous-vehicle purposes (e.g., six elongated segments, with five DOEWGs per segment), other embodiments may be possible as well, and such other embodiments may be designed/machined for various applications, including, but not limited to, automotive radar.

For instance, in such other embodiments, an antenna may include a minimum of a single DOEWG. With this arrangement, the output ports may radiate energy in all directions (i.e. low gain, wide beamwidth). Generally, an upper limit of segments/DOEWGs may be determined by a type of metal used for the first and second metal layers. For example, metal that has a high resistance may attenuate an electromagnetic wave as that wave travels down a waveguide channel. As such, when a larger, highly-resistive antenna is designed (e.g., more channels, more segments, more DOEWGs, etc.), energy that is injected into the antenna via the input port may be attenuated to an extent where not much energy is radiated out of the antenna. Therefore, in order to design a larger antenna, less resistive (and more conductive) metals may be used for the first and second metal layers. For instance, in embodiments described herein, at least one of the first and second metal layers may be aluminum. Further, in other embodiments, at least one of the first and second metal layers may be copper, silver, or another conductive material. Further, aluminum metal layers may be plated with copper, silver, or other low-resistance/high-conductivity materials to increase antenna performance. Other examples are possible as well.

The antenna may include at least one fastener configured to join the first metal layer to the second metal layer so as to align the first half of the one or more waveguide channels with the second half of the one or more waveguide channels to form the one or more waveguide channels (i.e., align the first half of the plurality of wave-dividing channels with the second half of the plurality of wave-dividing channels, and align the first half of the plurality of wave-radiating channels with the second half of the plurality of wave-radiating channels). To facilitate this in some embodiments, the first metal layer, a first plurality of through-holes (not shown in FIG. 5A) may be configured to house the at least one fastener. Additionally, in the second metal layer, a second plurality of through-holes (not shown in FIG. 5B) may be substantially aligned with the first plurality of through-holes and configured to house the at least one fastener for joining the second metal layer to the first metal layer. In such embodiments, the at least one fastener may be provided into the aligned first and second pluralities of through-holes and secured in a manner such that the two metal layers are joined together.

In some examples, the at least one fastener may be multiple fasteners. Mechanical fasteners (and technology used to facilitate fastening) such as screws and alignment pins may be used to join (e.g., screw) the two metal layers together. Further, in some examples, the two metal layers may be joined directly to each other, with no adhesive layer in between. Still further, the two metal layers may be joined together using methods different than adhesion, such as diffusion bonding, soldering, brazing, and the like. However, it is possible that, in other examples, such methods may be used in addition to or alternative to any methods for joining metal layers that are known or not yet known.

In some embodiments, one or more blind-holes may be formed into the first metal layer and/or into the second metal layer in addition to or alternative to the plurality of through-holes of the first and/or the second metal layer. In such embodiments, the one or more blind-holes may be used for fastening (e.g., housing screws or alignment pins) or may be used for other purposes.

FIG. 5C illustrates an assembled view of an example antenna 540. The example antenna 540 may include the first metal layer 500 and the second metal layer 520. The second metal layer 520 may include a plurality of holes 542 (through-holes and/or blind-holes) configured to house alignment pins, screws, and the like. The first metal layer 500 may include a plurality of holes as well (not shown) that are aligned with the holes 542 of the second metal layer 520. The two metal layers may join at a common plane 530.

Further, FIG. 5C illustrates a DOEWG array 544 of a given width 546 and a given length 548, which may vary based on the number of DOEWGs and channels of the antenna 540. Further, in such an example embodiment, these dimensions, in addition to or alternative to other dimensions of the example antenna 540, may be machined with no less than about a 0.51 mm error, though in other embodiments, more or less of an error may be required. Other dimensions of the DOEWG array are possible as well.

In some embodiments, the first and second metal layers 500, 520 may be machined from aluminum plates (e.g., about 6.35 mm stock). In such embodiments, the first metal layer 500 may be at least 3 mm in thickness (e.g., about 5.84 mm to 6.86 mm). Further, the second metal layer 520 may be machined from a 6.35 mm stock to a thickness of about 3.886 mm. Other thicknesses are possible as well.

In some embodiments, the joining of the two metal layers 500, 520 may result in an air gap or other discontinuity between mating surfaces of the two layers. In such embodiments, this gap or continuity should be proximate to (or perhaps as close as possible to) a center of the length of the antenna apparatus and may have a size of about 0.05 mm or smaller.

FIG. 5D illustrates another assembled view of the example antenna 540. As shown, the first metal layer 500 may include a plurality of holes 550 (through-holes and/or blind-holes) configured to house alignment pins, screws, and the like. One or more of the plurality of holes 550 may be aligned with the holes 542 of the second metal layer 520. Further, FIG. 5D shows the input port 512, where the antenna 540 may receive electromagnetic waves into the one or more waveguide channels 502. The two metal layers may join at a common plane 530.

FIG. 5E illustrates conceptual waveguide channels 560 formed inside an assembled example antenna. More particularly, the waveguide channels 560 take the form of the waveguide channels 502 of FIGS. 5A and 5B. For instance, the channels 560 include an input port 562 to the input waveguide channel 564. The channels 560 also include wave-dividing channels 566 and a plurality of radiating doublets 568 (i.e., a DOEWG array). As described above, when electromagnetic waves enter the channels 560 at the input port 562, they may travel in the +x direction through the input waveguide channel 564 and be divided into portions by the wave-dividing channels 566 (e.g., by the power dividers). Those portions of electromagnetic waves may then travel in the +x direction to respective radiating doublets 568, where sub-portions of those portions are radiated out each DOEWG through pairs of output ports, such as pair 570, for instance.

In a particular wave-radiating channel, a portion of electromagnetic waves may first be propagated through a first DOEWG with a recessed wave-directing member 572 (i.e., an inverse step, or "well"), as discussed above. This recessed wave-directing member 572 may be configured to radiate the smallest fraction of energy of all the members of the DOEWGs of the particular wave-radiating channel. In some examples, subsequent wave-directing members 574 may be formed (e.g., protruded, rather than recessed) such that each subsequent DOEWG can radiate a higher fraction of the remaining energy than the DOEWG that came before it. Phrased another way, each wave-directing member 572, 574 may generally be formed as a "step cut" into a horizontal (+x direction) channel (i.e., a wave-radiating channel, or the "first end" of an "elongated segment" as noted above) and used by the antenna to tune the amount of energy that is radiated vs. the amount of energy that is transmitted further down the antenna.

In some embodiments, a given DOEWG may not be able to radiate more than a threshold level of energy and may not be able to radiate less than a threshold level of energy. These thresholds may vary based on the dimensions of the DOEWG components (e.g., the wave-directing member, a horizontal channel, a vertical channel, a bridge between the two output ports, etc.), or may vary based on other factors associated with the antenna.

In some embodiments, the first and second metal layers may be machined such that various sides of the waveguide channels 560 have rounded edges, such as edge 576, 578, and 580, for example. Further shown in FIG. 5E are both attenuation ports 582 and attenuation components 584. The attenuation components 584 may be coupled to the attenuation ports 582. And the attenuation ports 582 may be coupled to the elongated segments 522 of the wave-dividing channels 566. The design of the attenuation components 584 and attenuation ports 582 are discussed further with respect to FIG. 6B. In examples, where the beamforming (i.e. dividing network) is not completely reactive the attenuation ports 582 may be used to removed electromagnetic energy from the waveguides. The attenuation ports 582 may couple electromagnetic energy to attenuation components 584 in order to absorb the undesired electromagnetic energy. Additionally, the dashed line 588 indicates the common plane of the feed waveguides.

Figure 6A:
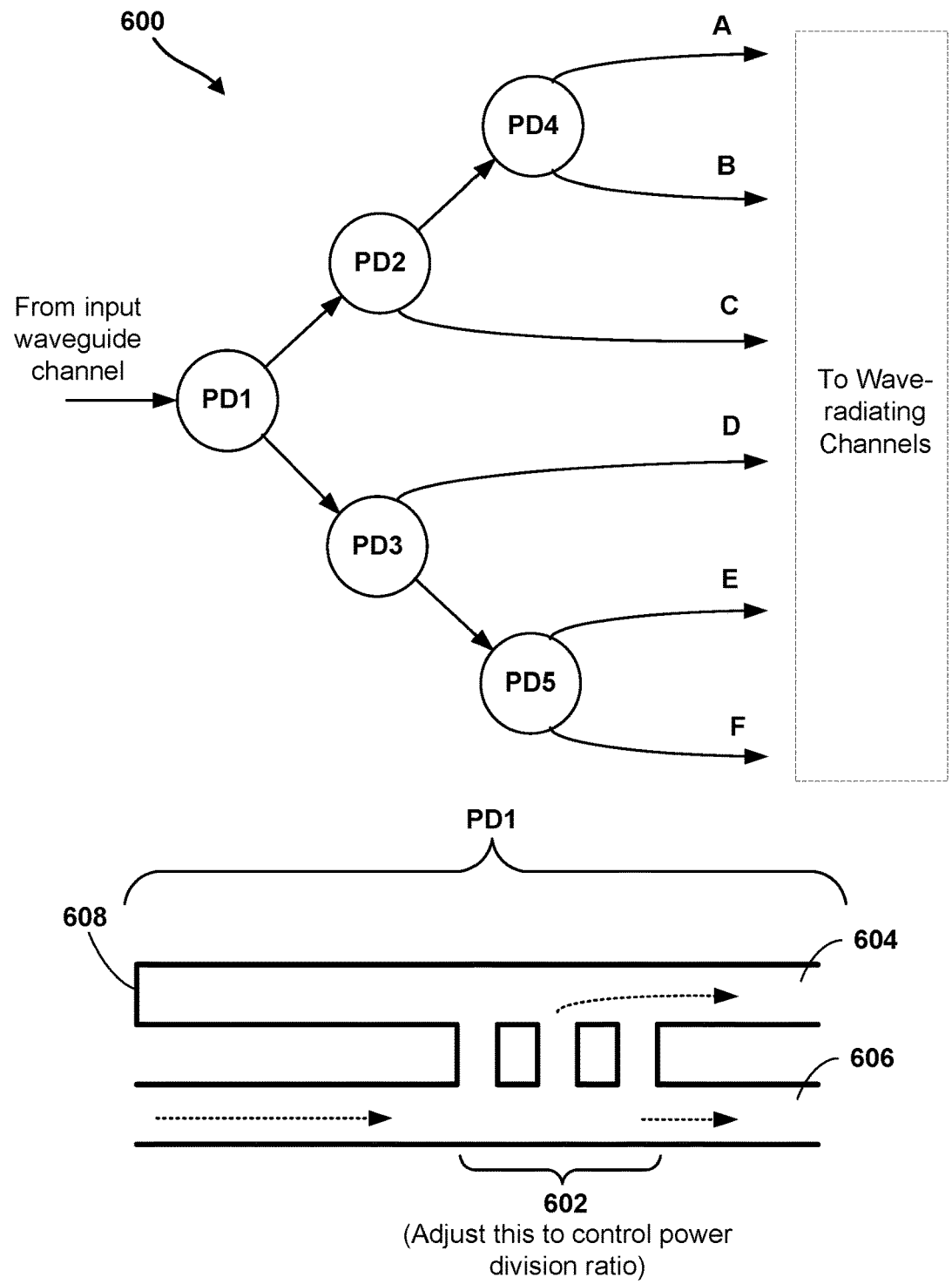
FIG. 6A illustrates a network of wave-dividing channels of an example antenna, in accordance with an example embodiment.
Figure 6B:
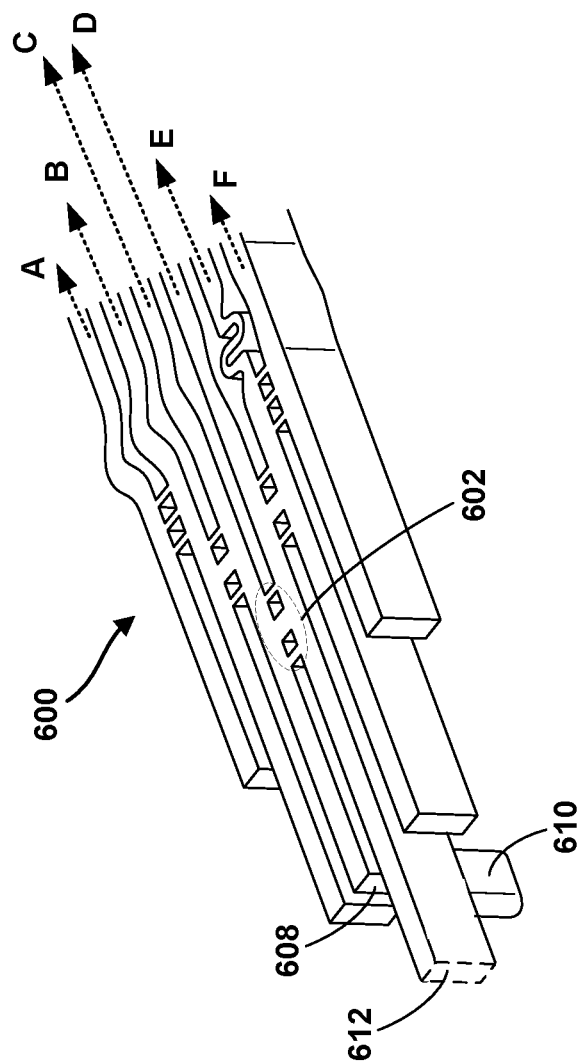
FIG. 6B illustrates an alternate view of the network of wave-dividing channels of FIG. 6A, in accordance with an example embodiment.

FIG. 6A illustrates a network of wave-dividing channels 600 of an example antenna, in accordance with an example embodiment. And FIG. 6B illustrates an alternate view of the network of wave-dividing channels 600, in accordance with an example embodiment.

In some embodiments, the network (e.g., beam-forming network, as noted above) of wave-dividing channels 600 may take the form of a tree of power dividers, as shown in FIG. 6A. Energy may enter the antenna through the input waveguide channel and is divided (i.e., split) into smaller portions of energy at each power divider, such as power divider 602, and may be divided multiple times via subsequent power dividers so that a respective amount of energy is fed into each of the wave-radiating channels (energy A-F, as shown). The amount of energy that is divided at a given power divider may be controlled by a power division ratio (i.e., how much energy goes into one channel 604 versus how much energy goes into another channel 606 after the division). A given power division ratio may be adjusted based on the dimensions of the corresponding power divider. Further, each power divider and associated power division ratio may be designed/calculated in order to achieve a desired "power taper" at the wave-radiating channels. In such a case, the antenna may be designed with a "Taylor window" (e.g., radiation ripples drop off at edges) or other window such that sidelobes of the antenna's far-field radiation pattern may be low. As an example, the power division ratios of the power dividers may be set such that energy portions A, B, C, D, E, and F are approximately 3.2%, 15.1%, 31.7%, 31.7%, 15.1%, 3.2% of the energy, respectively. Other example power divisions are possible as well.

Within examples, a technique for dividing energy between two channels 604, 606 may be to use a structure of channels (e.g., a four-port branchline coupler) such as that shown at the bottom of FIG. 6A. Such a technique and structure design may include a "terminator" 608 at the end of a channel, as shown in FIGS. 6A and 6B, where small wedges of radio frequency-absorbing material may be located to absorb energy that returns backwards through the channel to that terminator 608. The terminator may also be the absorption component of FIG. 5E.

Figure 7A:
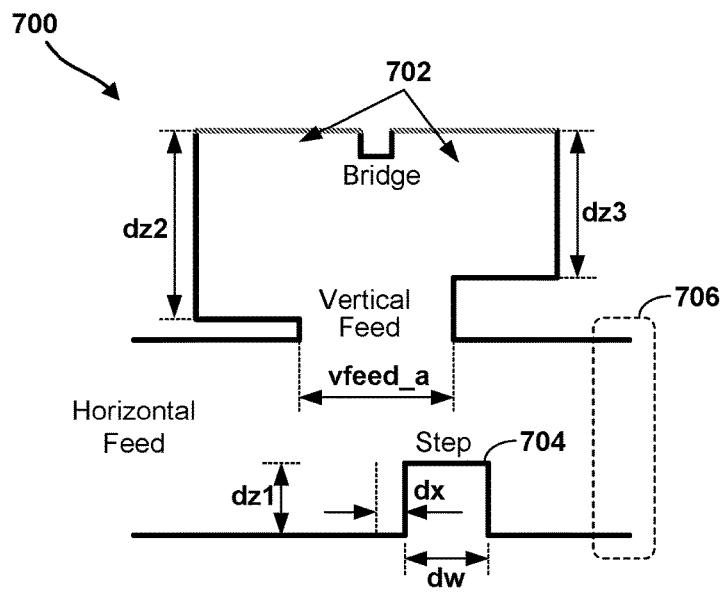
FIG. 7A illustrates an example wave-radiating portion of an example antenna, in accordance with an example embodiment.
Figure 7B:
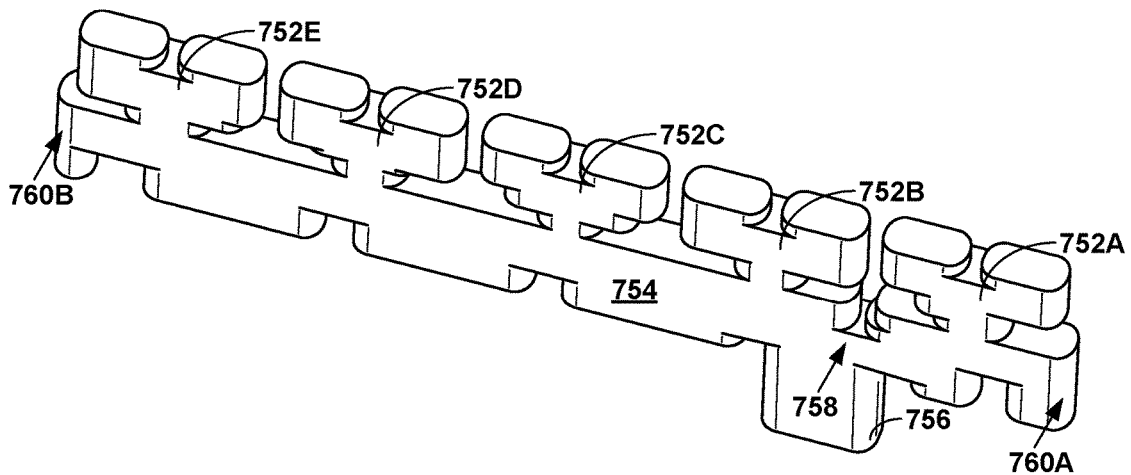
FIG. 7B illustrates an example offset feed waveguide portion of an example antenna, in accordance with an example embodiment.

FIG. 7A illustrates an example wave-radiating doublet of an example antenna, in accordance with an example embodiment. More specifically, FIG. 7A illustrates a cross-section of an example DOEWG 700. As noted above, a DOEWG 700 may include a horizontal feed (i.e., channel), a vertical feed (i.e. a doublet neck), and a wave-directing member 704. The vertical feed may configured to couple energy from the horizontal feed to two output ports 702, each of which is configured to radiate at least a portion of electromagnetic waves out of the DOEWG 700. In some embodiments, the farthest DOEWG from the input port may include a backstop at location 706. DOEWGs that come before the last DOEWG may simply be open at location 706 and electromagnetic waves may propagate through that location 706 to subsequent DOEWGs. For example, a plurality of DOEWGs may be connected in series where the horizontal feed is common across the plurality of DOEWGs (as shown in FIG. 7B). FIG. 7A shows various parameters that may be adjusted to tune the amplitude and/or phase of an electromagnetic signal that couples into the radiating element.

In order to tune a DOEWG such as DOEWG 700, the vertical feed width, vfeed_a, and various dimensions of the step 704 (e.g., dw, dx, and dz1) may be tuned to achieve different fractions of radiated energy out the DOEWG 700. The step 704 may also be referred to as a reflecting component as it reflects a portion of the electromagnetic waves that propagate down the horizontal feed into the vertical feed. Further, in some examples, the height dz1 of the reflecting component may be negative, that is may extend below the bottom of the horizontal feed. Similar tuning mechanisms may be used to tune the offset feed as well. For example, the offset feed may include any of the vertical feed width, vfeed_a, and various dimensions of the step (e.g., dw, dx, and dz1) as discussed with respect to the radiating element.

In some examples, each output port 702 of the DOEWG 700 may have an associated phase and amplitude. In order to achieve the desired phase and amplitude for each output port 702, various geometry components may be adjusted. As previously discussed, the step (reflecting component) 704 may direct a portion of the electromagnetic wave through the vertical feed. In order to adjust an amplitude associated with each output port 702 of a respective DOEWG 700, a height associated with each output port 702 may be adjusted. Further, the height associated with each output port 702 could be the height or the depths of this feed section of output port 702, and not only could be a height or depth adjustment but it could be a multiplicity of these changes or steps or ascending or descending heights or depths in general.

As shown in FIG. 7A, height dz2 and height dz3 may be adjusted to control the amplitude with respect to the two output ports 702. The adjustments to height dz2 and height dz3 may alter the physical dimensions of the doublet neck (e.g. vertical feed of FIG. 7A). The doublet neck may have dimensions based on the height dz2 and height dz3. Thus, as the height dz2 and height dz3 are altered for various doublets, the dimensions of the doublet neck (i.e. the height of at least one side of the doublet neck) may change. In one example, because height dz2 is greater than height dz3, the output port 702 associated with (i.e. located adjacent to) height dz2 may radiate with a greater amplitude than the amplitude of the signal radiated by the output port 702 associated with height dz3.

Further, in order to adjust the phase associated with each output port 702, a step 710A and 710B may be introduced for each output port 702. The step 710A and 710B in the height may cause a phase of a signal radiated by the output port 702 associated with the step to change. Thus, by controlling both the height and the step 710A and 710B associated with each output port 702, both the amplitude and the phase of a signal transmitted by the output port 702 may be controlled. In various examples, the step 710A and 710B may take various forms, such as a combination of up-steps and down-steps. Additionally, the number of steps 710A and 710B may be increased or decreased to control the phase.

The above-mentioned adjustments to the geometry may also be used to adjust a geometry of the offset feed where it connects to the waveguide. For example, heights, widths, and steps may be adjusted or added to the offset feed in order to adjust the radiation properties of the system. An impedance match, phase control, and/or amplitude control may be implemented by adjusting the geometry of the offset feed.

FIG. 7B illustrates an example offset feed waveguide portion 756 of an example antenna, in accordance with an example embodiment. As shown in FIG. 7B, a waveguide 754 may includes a plurality of radiating elements (shown as 752A-752E) and an offset feed 756. Although the plurality of radiating elements are shown as doublets in FIG. 7B, other radiating structures may be use as well. For example, singlets, and any other radiating structure that can be coupled to a waveguide may be used as well.

The waveguide 754 may be configured in a similar manner to those waveguides discussed throughout this disclosure. For example, the waveguide 754 may include various shapes and structures configured to direct electromagnetic power to the various radiating elements 752A-E of waveguide 754. As discussed with respect to FIG. 5E, a portion of electromagnetic waves propagating through waveguide 754 may be divided and directed by various recessed wave-directing member (572 of FIG. 5E) and raised wave-directing members (574 of FIG. 5E). The pattern of wave-directing members shown in FIG. 7B is one example for the wave-directing members. Based on the specific implementation, the wave-directing members may have different sizes, shapes, and locations. Additionally, the waveguide may be designed to have the waveguide ends 760A and 760B to be tuned shorts. For example, the geometry of the ends of the waveguides may be adjusted so the waveguide ends 760A and 760B act as tuned shorts.

At each junction of a respective radiating elements 752A-E of waveguide 754, the junction may be considered a two-way power divider. A percentage of the electromagnetic power may couple into the neck of the respective radiating elements 752A-E and the remaining electromagnetic power may continue to propagate down the waveguide. By adjusting the various parameters (e.g. neck width, heights, and steps) of each respective radiating element 752A-E, the respective percentage of the electromagnetic power may be controlled. Thus, the geometry of each respective radiating element 752A-E may be controlled in order to achieve the desired power taper. Thus, by adjusting the geometry of each of the offset feed and the each respective radiating element 752A-E, the desired power taper for a respective waveguide and its associated radiating elements may be achieved.

Electromagnetic energy may be injected into the waveguide 754 via the waveguide feed 756. The waveguide feed 756 may be a port (i.e. a through hole) in a bottom metal layer, such as layer 304 of FIG. 3. An electromagnetic signal may be coupled from outside the antenna unit into the waveguide 754 through the waveguide feed 756. The electromagnetic signal may come from a component located outside the antenna unit, such as a printed circuit board, another waveguide, or other signal source. In some examples, the waveguide feed 756 may be coupled to another dividing network of waveguides (such as or similar to the dividing networks described with respect to FIGS. 5A, 5B, and 5E).

In some additional examples, the various radiating elements 752A-E may be configured to receive electromagnetic energy. In these examples, the waveguide feed 756 may be used to remove electromagnetic energy from the waveguide 754. When electromagnetic energy is removed from the waveguide 754, it may be coupled into components for further processing.

In many traditional examples, a waveguide feed is located at the end of a waveguide. In the example shown in FIG. 7B, the waveguide feed 756 is located at an offset position from the ends of the waveguide between radiating elements 752A and 752B. By locating the waveguide feed 756 at an offset position, the electromagnetic energy that couples into the waveguide 754 may be divided more easily. Further, by locating the waveguide feed 756 at an offset position, an antenna unit may be designed in a more compact manner.

When electromagnetic energy enters waveguide 754, it will be split in order to achieve a desired radiation pattern.

For example, it may be desirable for each of a series of radiating elements 752A-E to receive a predetermined percentage of the electromagnetic energy from the waveguide 754. The waveguide may include a power dividing element 758 that is configured to split the electromagnetic energy the travels down each side of the waveguide. In some examples, the power dividing element 758 may cause the power to be divided evenly or unevenly. The radiating elements 752A-E are configured to radiate the electromagnetic energy they receive. In some examples, each radiating element 752A-E may receive approximately the same percentage of the electromagnetic energy as each other radiating element 752A-E. In other examples, each radiating element 752A-E may receive a percentage of the electromagnetic energy based on a taper profile.

In some example taper profiles, radiating elements 752A-E located closer to the center of waveguide 754 may receive a higher percentage of the electromagnetic energy. If electromagnetic energy is injected into the end of the waveguide 754, it may be more difficult to design the waveguide 754 to correctly split power between the various radiating elements 752A-E. By locating the waveguide feed 756 at an offset position, a more natural power division between the various radiating elements 752A-E may be achieved. The offset position for the waveguide feed 756 may be any position along the waveguide 754 where the waveguide feed 756 is location corresponding to a position at or between some of the radiating elements.

In one example, the waveguide 754 may have 10 radiating elements and the waveguide feed 756 may be located in at a position with 5 radiating elements on each side of the waveguide feed 756. The radiating elements may have an associated taper profile that specifies the radiating elements in the center should receive a higher percentage of the electromagnetic energy than the other elements. Because the waveguide feed 756 is located closer to the center elements, it is more natural to divide power with elements closest to the waveguide feed 756 receiving higher power. Further, if the waveguide 754 has the waveguide feed 756 located at the center of the waveguide 754, the waveguide 754 may be designed in a symmetrical manner to achieve the desired power division. In examples where the waveguide feed 756 is located away from the center of the radiating elements, the waveguide 754 may be designed to split the power in an uneven (i.e. non-symmetric) manner.

In some examples, the present system may operate in one of two modes. In the first mode, the system may receive electromagnetic energy from a source for transmission (i.e. the system may operate as a transmission antenna). In the second mode, the system may receive electromagnetic energy from outside of the system for processing (i.e. the system may operate as a reception antenna). In the first mode, the system may receive electromagnetic energy at a waveguide feed, divide the electromagnetic energy for transmission by a plurality of radiating elements, and radiate the divided electromagnetic energy by the radiating elements. In the second mode, the system may receive electromagnetic energy at the plurality of radiating elements, combine the received electromagnetic energy, and couple the combined electromagnetic energy out of system for further processing.

It should be understood that other shapes and dimensions of the waveguide channels, portions of the waveguide channels, sides of the waveguide channels, wave-directing members, and the like are possible as well. In some embodiments, a rectangular shape of waveguide channels may be highly convenient to manufacture, though other methods known or not yet known may be implemented to manufacture waveguide channels with equal or even greater convenience.

Figure 7C:
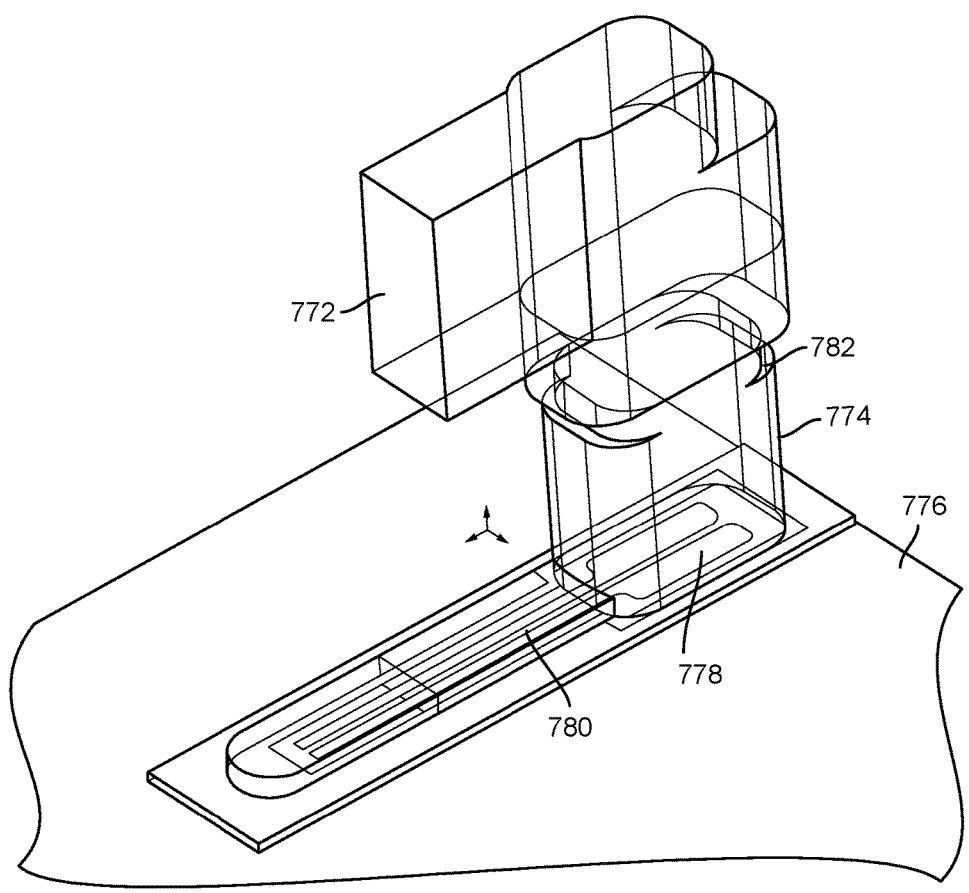
FIG. 7C illustrates an example waveguide termination comprising coupling port, attenuation components, and a coupling component, that uses PCB based absorbers.

FIG. 7C illustrates an example waveguide 772 termination comprising coupling port 774, attenuation components 780, and the coupling component 778. The attenuation components 780 may be mounted on a PCB 776 (e.g. the attenuation components 780 may be metallic traces on a PCB). The PCB may be mounted to a bottom surface of an antenna like that shown in FIG. 5D. Furthermore, FIG. 7C illustrates one example use of a coupling port 774. The coupling port 774 may also be used in instances other than the presently disclosed antenna apparatus. For example, the coupling port 774 may be used in any instance where an electromagnetic signal is being coupled into and/or out of a waveguide. Further, the coupling port 774 as disclosed herein may also be used to efficiently couple a signal from a PCB to a radiating structure, like an antenna, without the use of the waveguide beamforming network.

Although FIG. 7C is shown with the coupling component 778 as a differential pair connected to attenuation components 780, in other examples, the coupling component 778 may be a different shape, such as a single patch. Additionally, the coupling component 778 may be a bidirectional component that may be able to both feed an electromagnetic signal for transmission by the antenna unit and couple an electromagnetic signal from the waveguide to an attenuation component.

The waveguide 772 of FIG. 7C may be a portion of a waveguide elongated segments, such as elongated segments 504 of FIG. 5A. More specifically, the waveguide 772 of FIG. 7C may be one of the elongated segments that does not include the feed. As previously discussed, during the operation of the antenna some electromagnetic energy that is not radiated by the radiation components may be reflected back into the waveguide. In order to remove the reflected electromagnetic energy, the waveguide 772 may be coupled to a coupling port 774. The coupling port 774 may be aligned perpendicularly, and out of the plane of the waveguide 772. The coupling port 774 may be configured to couple the reflected electromagnetic energy to an attenuation component (shown here as lines 780) located on a PCB 776 by way of a coupling component 778.

In some examples, such as shown in FIG. 7C, each coupling port 774 may be shaped in a way to match (or approximately match) an impedance of the waveguide. By impedance matching, the amount of the reflected electromagnetic energy that is coupled from the waveguide 772 to the coupling port 774 may be maximized. For example, the coupling port 774 may have portions that are of different dimensions to achieve the correct impedance matching. Further, in instances where an antenna unit has multiple coupling ports, each coupling port may have its own dimensions based on the impedance match desired for each respective coupling port.

The coupling port 774 is shown having a neck 782 that has a narrower dimension than the rest of the coupling port 774. In this example by narrowing the neck 782 the inductance of the coupling port 774 is increased. The increase in inductance may be used to match (or more approximately match) the impedance of the coupling component 778 with the impedance of the waveguide 772. When the impedance is matched, the power transfer of the electromagnetic energy between the waveguide 772 and the coupling component 778 may be maximized. A widening of the width of the coupling port 774 may increase the capacitance of coupling port 774. Depending on the specific embodiment, the dimensions of the coupling port 774 may be designed for an impedance match between the waveguide 772 and the coupling component 778.

Additionally, the coupling port 774 and coupling component 778 are shown coupling to the bottom of the waveguide. In other examples, the alignment of the coupling port 774, PCB 776, and coupling component 778 may have a different alignment. For example, the coupling may be to a side or end of a waveguide as well (i.e. coupled orthogonally to the direction of the plane of the waveguide layer).

To create the coupling port 774, the coupling port 774 may be machined from both the top side of the coupling port 774 and the bottom side of the coupling port 774. By designing a coupling port 774 that has dimensions that can be machined from both sides, a coupling port 774 may be created that performs the impedance matching function while also being relatively simple to manufacture. More complex versions of the coupling port may be designed as well, but having a port that may be machined from both the top and bottom side of the coupling port may decrease machining complexity.

As previously discussed, the coupling component 778 is configured to couple at least a portion of the reflected electromagnetic energy from the waveguide to the attenuation component 780 through the coupling port 774. In this way, when the coupling component 778 couples the at least a portion of the reflected electromagnetic energy, the coupling component 778 may essentially act as a receiving antenna. The coupling component 778 receives the at least a portion of the reflected electromagnetic energy from the waveguide and couples it through the coupling port.

In other examples, the coupling port 774 may function to inject electromagnetic energy into the waveguide. In this example, component 778 is configured to couple at least a portion of the electromagnetic energy from feed traces (not shown) on the PCB 776 to the waveguide 772 through the coupling port 774. In this way, when the coupling component 778 couples the at least a portion of the electromagnetic energy, the coupling component 778 may essentially act as a transmitting antenna. The coupling component 778 transmits at least a portion of the electromagnetic energy from the feed traces and couples it through the coupling port.

In various different examples, the coupling component 778 may take different forms. For example, the coupling component 778 may be a metallic loop-shaped structure, as shown in FIG. 7C. The coupling component 778 may function similarly to an antenna, that is the coupling component 778 may be able to transmit or receive electromagnetic energy (i.e. a wave). Functionally, in one example, the coupling component 778 may be a component configured to convert a guided wave from a waveguide to a guided wave outside of the waveguide (e.g. couple the wave to an attenuation component). In another example, the coupling component 778 may be a component configured to convert a guided wave from outside the waveguide to a guided wave in a waveguide.

In various examples, the coupling component 778 may be made in various ways and with various materials. The coupling component may be a metallic trace (or patch) on the circuit board 776. However, in other examples, the coupling component may be a discrete component attached to the PCB. For example, the coupling component may be formed of a ceramic that is coated, plated, or otherwise overlaid with metal. The coupling component 778 may also be formed from stamped metal, bent metal, or other another metal structure. In some additional examples, the coupling component 778 may itself be a metallic strip or component on a second circuit board that may be surface mounted to PCB 776.

Therefore, there are many structures that can function to cause the conversion of the wave from a wave in the waveguide to a wave not in the waveguide and can take the place of coupling component 778.

In some examples, the coupling component 778 may be a bi-directional coupler that functions to both (i) couple a signal from outside the waveguide into the waveguide and (ii) couple signal from inside the waveguide out of the waveguide.

In some further examples, the coupling component 778 may be configured to couple a differential mode signal from outside the waveguide into the waveguide. In some additional examples, the coupling component 778 may be configured to couple signal from inside the waveguide out of the waveguide as a differential mode signal.

In some additional examples, the coupling component 778 may be configured to couple a single mode signal from outside the waveguide into the waveguide. In some additional examples, the coupling component 778 may be configured to couple signal from inside the waveguide out of the waveguide as a single mode signal.

In various embodiments, the coupling component 778 may be designed to have an impedance that optimizes the percentage of electromagnetic energy that the coupling component 778 couples between its input and output.

Figure 8A:
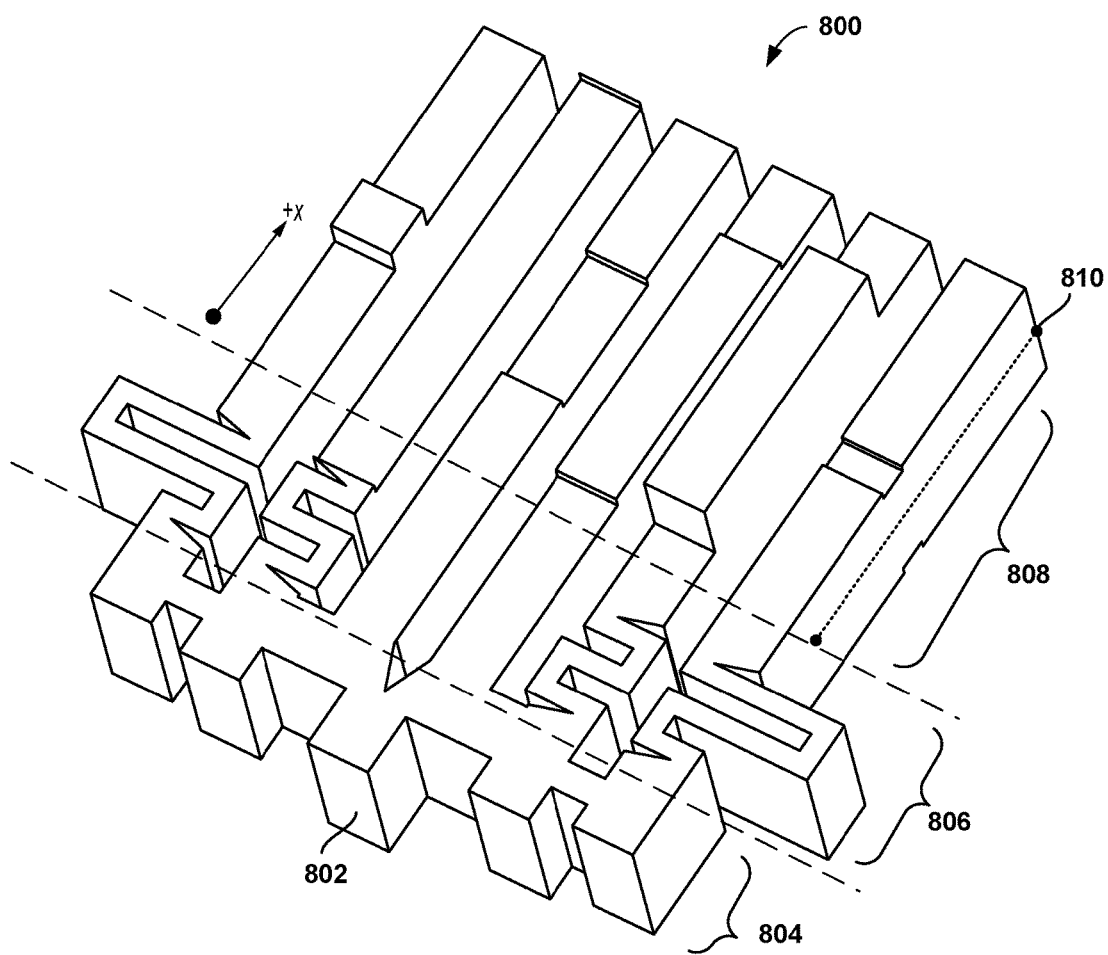
FIG. 8A illustrates an example two-dimensional beam-forming network, in accordance with an example embodiment.

FIG. 8A illustrates an example two-dimensional beamforming network, in accordance with an example embodiment. The two-dimensional beamforming network has two main components. The two-dimensional beamforming network includes a waveguide input 802, a power dividing section 804, and a phase adjusting section 806. The two-dimensional beamforming network may be located in the same plane of the split-block assembly as the feed waveguides.

The two-dimensional beamforming network of FIG. 8A may include only reactive components. As previously discussed, the use of reactive components may eliminate the need for beamforming network to include absorption components that were previously discussed.

The two-dimensional beamforming network may receive electromagnetic energy at the waveguide input 802, ends 808A-808D may be shorts. The received electromagnetic energy may be divided by the power dividing section 804. The power dividing section 804 may divide the electromagnetic energy as divided electromagnetic energy based on a predetermined taper profile. The divided electromagnetic energy may have its phase adjusted by the phase adjusting section 806. The phase adjustment provided by of each respective phase adjusting trombones sections (806A-806F) in splitting section 806 may also be defined based on the taper profile. As shown in FIG. 8A, a portion of the waveguides of the phase adjusting section 806 may have a width that is different than the widths of the feed waveguides. Further, the waveguides of phase adjusting section 806 may be folded so each respective phase adjusting section 806 occupies the same physical length in the x direction.

The power dividing elements of FIG. 8A are a two-dimensional dividing network of waveguides. The two-dimensional dividing network of waveguides use waveguide geometry to divide power with no changes to the thickness of the waveguide A dimension. As previously discussed, the feed waveguides may have a predetermined height and width. The predetermined height and width may be based on a frequency of operation of radar unit. The two-dimensional dividing network may include waveguides 806A-806F that differ in width from the predetermined width (i.e. the N dimension) of the feed waveguides in order to achieve the desired taper profile. By adjusting the waveguide widths, both the phase and amplitude of the splitting of the electromagnetic energy may be controlled. Thus, the dividing network may have a geometry that is varied compared to the feed waveguide geometry.

In the present disclosure, the feed waveguides may be divided between the top and bottom portions of the split-block assembly. Further, the feed waveguides and the two-dimensional dividing network may all be located in a common plane 810 where the midpoint of the height of feed waveguides is common for all of the feed waveguides. When the two block pieces are brought together, the two half-height waveguide portions may couple and form a full-height waveguide.

Figure 8B:
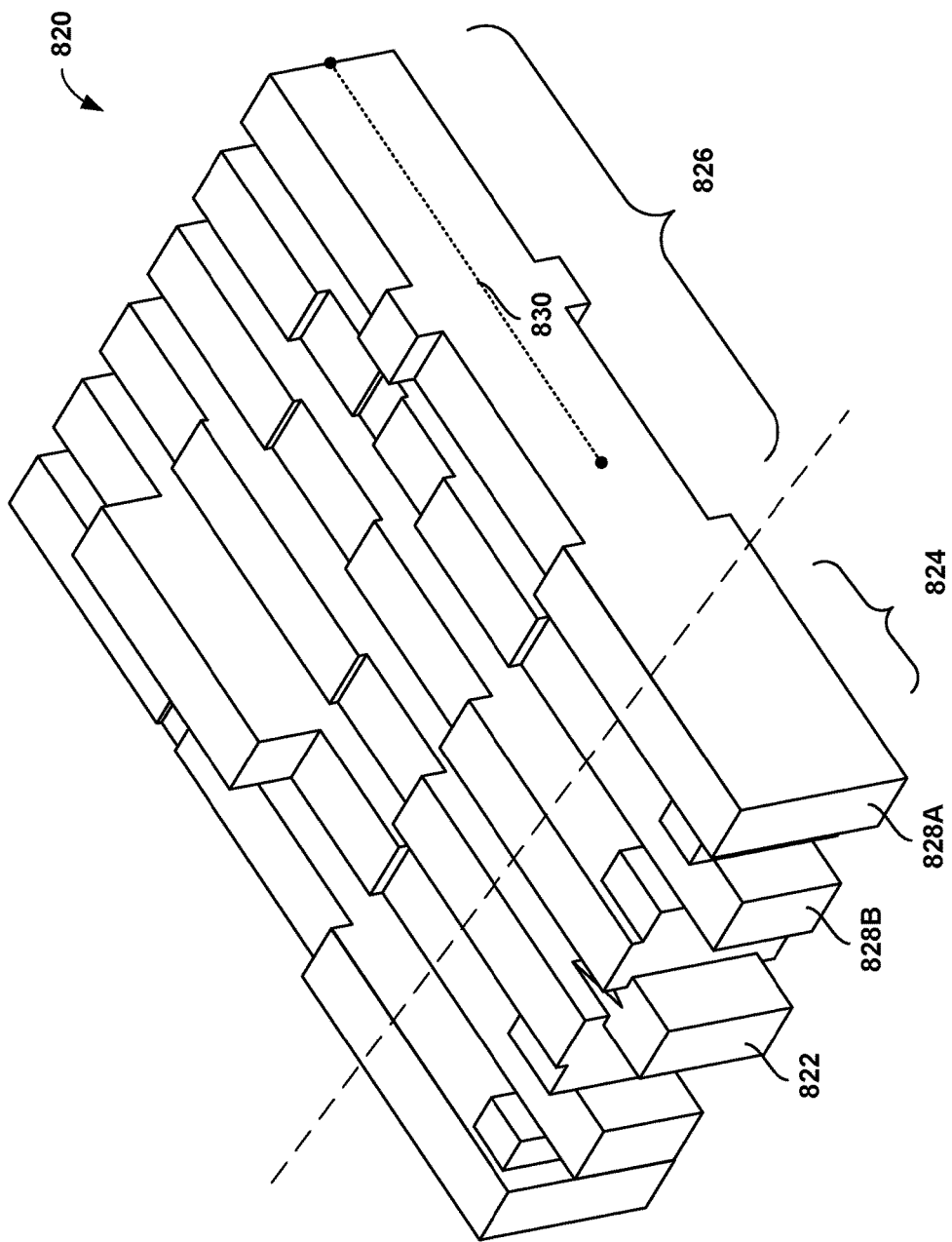
FIG. 8B illustrates an example three-dimensional beam-forming network, in accordance with an example embodiment, showing a power dividing section and a phase adjustment lens.

FIG. 8B illustrates an example three-dimensional beamforming network, in accordance with an example embodiment. The three-dimensional beamforming network has three main components. The three-dimensional beamforming network includes a waveguide input 822, a power dividing section 824, a phase adjusting section 826 (i.e. a three dimensional phase adjusting lens). The three-dimensional beamforming network may not be completely located in the same plane of the split-block assembly as the feed waveguides.

The three-dimensional beamforming network of FIG. 8B may include only reactive components. As previously discussed, the use of reactive components may enable the beamforming network to not need the absorption components that were previously discussed.

The three-dimensional beamforming network may receive electromagnetic energy at the waveguide input 822, ends 828A-828D may be shorts. The received electromagnetic energy may be divided by the three dimensional power dividing section 824. The power dividing section 824 may divide the electromagnetic energy as divided electromagnetic energy based on a predetermined taper profile. The divided electromagnetic energy may have its phase adjusted by the phase adjusting (three dimensional phase adjusting lens) section 826. The phase adjustment provided by of each respective phase adjusting section 826 may be achieved by the adjustments of heights (i.e. the A dimension) of the waveguide sections, without any changes to widths (i.e. the B dimension) may also be defined based on the taper profile. The output of the phase adjustment section 826 may be coupled to the feed waveguides as shown in FIG. 8C.

The power dividing elements of FIG. 8B of the DOEWG antenna are a three-dimensional dividing network of waveguides. Similar to the two-dimensional waveguide of FIG. 8A, the three-dimensional dividing network of waveguides may use waveguide geometry to divide power. The predetermined height and width of the feed waveguides may be based on a frequency of operation of the radar unit. The three-dimensional dividing network may include waveguides that differ in height and width from the predetermined height and width of the feed waveguides in order to achieve the desired taper profile. For example, waveguide 828A and 828B are shown having a different height.

As discussed above, the three-dimensional dividing network of waveguides may be located partly in the common plane 830 as the feed waveguides and partly in at least one other plane. For example, the entire height of a portion of the three-dimensional dividing network of waveguides may be machined into either the first or second portion of the split-block assembly. When the two block pieces are brought together, a surface of the other block portion may form an edge of the portion or the three-dimensional dividing network of waveguides that has its height fully in one of the two block sections.

Figure 8C:
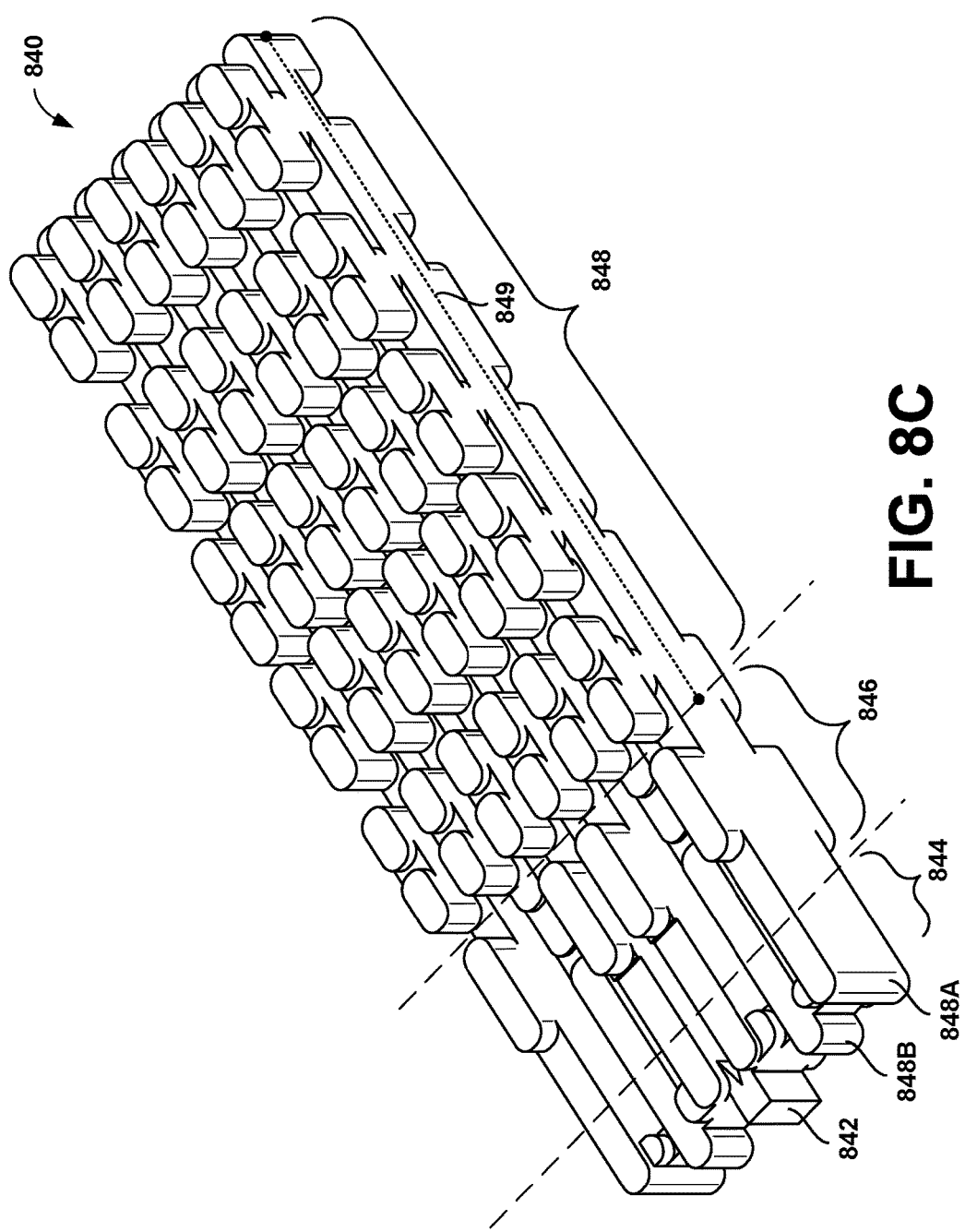
FIG. 8C illustrates an example three-dimensional beam-forming network feeding an array of antennas, in accordance with an example embodiment.

FIG. 8C illustrates an example three-dimensional beamforming network, in accordance with an example embodiment. The three-dimensional beamforming network of FIG. 8C may operate in a similar manner to the previously described beamforming network of FIG. 8B. The three-dimensional beamforming network includes a waveguide input 842, a power dividing section 844, and a phase adjusting section 846. The three-dimensional beamforming network may not be completely located in the common plane 849 of the split block construction as the feed waveguides. Additionally, FIG. 8C shows the radiating section 848 that includes the feed waveguides and the radiating elements. Further, waveguide 848A and 848B are shown having a different height.

Figure 8E:
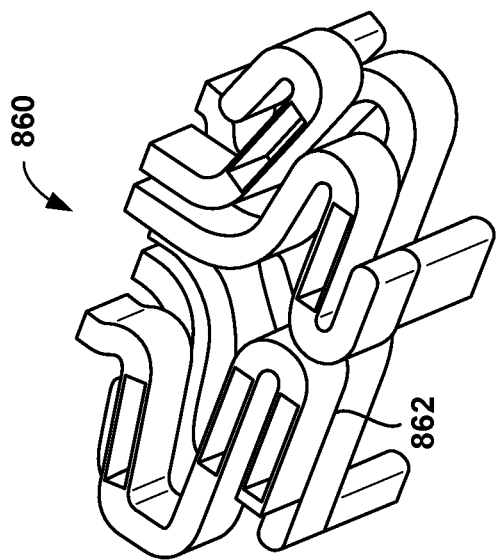
FIG. 8E illustrates an example three-dimensional beam-forming network with short wall coupling, in accordance with an example embodiment.
Figure 8D:
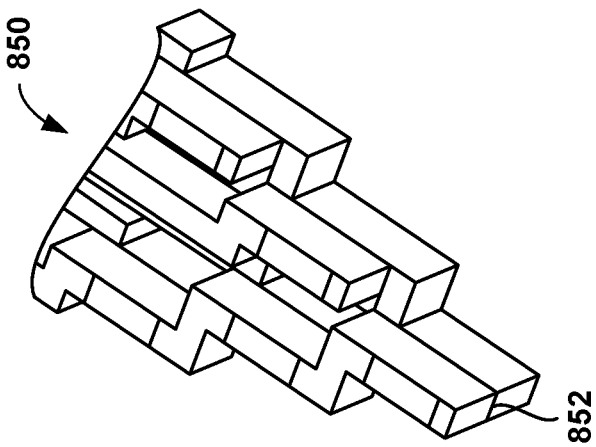
FIG. 8D illustrates an example three-dimensional beam-forming network with short wall coupling, in accordance with an example embodiment.

FIG. 8D illustrates another example three-dimensional unfolded beamforming network 850 with short wall coupling elements, designated in two examples as 854A and 854B, typically shown as one in the input designated as 852A, in accordance with an example embodiment. Additionally, FIG. 8E illustrates an example three-dimensional folded beamforming network 860 (i.e. a folded version of FIG. 8D) with short wall coupling, designated in two examples as 864A and 864B, in accordance with an example embodiment. This version may be much shorter (in the x-direction) than the unfolded version of FIG. 8D, and may use absorption load elements to provide termination on the PCB. The three-dimensional folded beamforming network with short wall coupling 850 and 860 may not use exclusively reactive elements. Thus, the three-dimensional beamforming network with short wall coupling 850 and 860 may use the previously-discussed absorption components. Additionally, the power division and phase shifting may be based on a predetermined taper profile (as previously discussed). Additionally, the waveguides that form a three-dimensional beamforming network with short wall coupling 850 and 860 may not all be located in the plane defined by the feed waveguides (the plane is defined by 852 and 862 respectively).

The dividing and phase shifting provided by three-dimensional beamforming network with short wall coupling 850 and 860 may be performed based on two stacked waveguide sections having short wall sections that are adjacent to each other. When the short walls are adjacent to each other, they may be separated by a thin metal layer to provide the coupling apertures.

The separation metal layer may be a thin metal layer. The thin metal layer may include a coupling aperture (discussed further with respect to FIG. 8F). The coupling aperture may enable electromagnetic energy to couple from one waveguide section into another waveguide section that is coupled to the short walls. In some examples, one waveguide may be formed in a top block of the split block and the other waveguide may be formed in a bottom block of the split block. The thin metal layer may be located between the two block sections. The three-dimensional beamforming network with short wall coupling 850 and 860 may also have a ramp section. The ramp section may couple a section of waveguide that is not in the common plane of the feed waveguides into the common plane of the feed waveguides. In another example, the ramp section (shown as 882 of FIG. 8F) may couple two adjacent sections of waveguide that are not in the common plane of the feed waveguides into the common plane of the feed waveguides (shown as 880 of FIG. 8F).

The power dividing elements of FIG. 8D of the DOEWG antenna are a three-dimensional dividing network of waveguides. The three-dimensional dividing network of waveguides may form hybrid couplers to divide the electromagnetic energy. As previously discussed, the three-dimensional dividing network may include waveguides that have a portion of the length of a respective waveguide adjacent to the length of a portion of another waveguide. The waveguides may have adjacent short walls. The two waveguides may be separated by a thin metal sheet. The coupling aperture may be formed based on cutouts, holes, or spaces in the thin metal sheet that allows electromagnetic energy to couple from one waveguide to the adjacent waveguide.

Additionally, in a region that forms a short wall hybrid coupler, a full-height waveguide may be formed in a top block portion and a full-height waveguide may be formed in a bottom block portion. A thin metal layer may be located at the seam between the two block portions to form both an edge of the respective waveguide of the dividing network and a coupling aperture. Holes, cuts, perforations, or areas without the thin metal layer may form the aperture by which electromagnetic energy may couple from one waveguide of the dividing network to another waveguide of the dividing network.

Figure 8F:
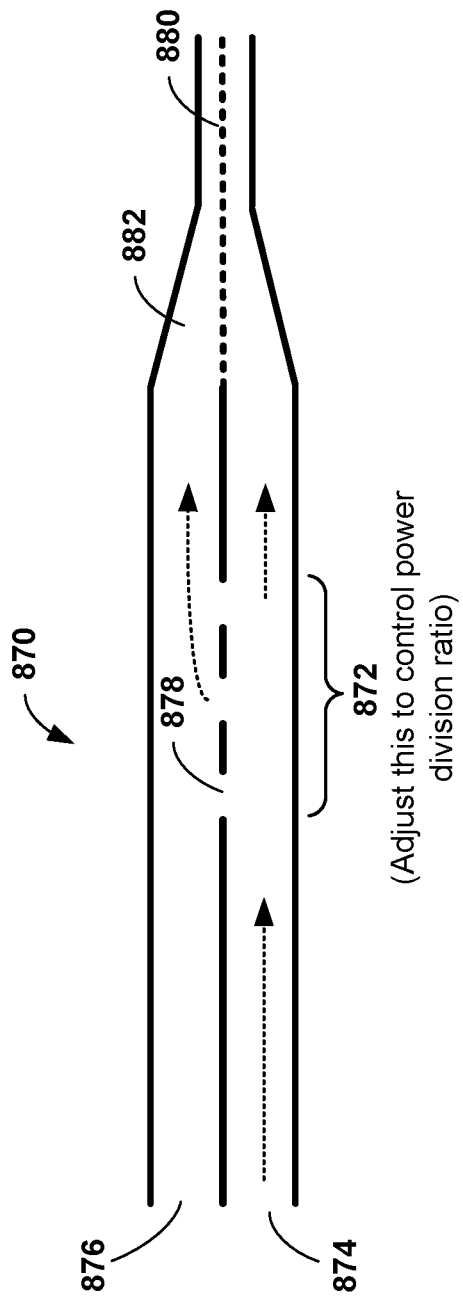
FIG. 8F illustrates an example short wall coupler, in accordance with an example embodiment.

FIG. 8F illustrates an example short wall coupler, in accordance with an example embodiment. The short wall coupler may function in a similar manner to branch line coupler of FIG. 3A. However, the short wall coupler is formed between two sections that are aligned vertically adjacent to each other or can be thought as stacked one on top of another with the shared short wall being a thin metal sheet.

Energy may enter the antenna through an input waveguide channel and is divided (i.e., split) into smaller portions of energy at each power divider, such as power divider 870, and may be divided multiple times via subsequent power dividers so that a respective amount of energy is fed into each of the feed waveguides. The amount of energy that is divided at a given power divider may be controlled by a power division ratio (i.e., how much energy goes into one channel 304 versus how much energy goes into another channel 306 after the division). A given power division ratio may be adjusted based on the dimensions of the corresponding power divider. Further, as previously discussed each power divider and associated power division ratio may be designed/calculated in order to achieve a desired "power taper" at the wave-radiating channels.

Within examples, (such as that shown in FIG. 8F) a technique for dividing energy between two vertically adjacent waveguides 874, 876 may be to use a thin metal layer with a coupling aperture 872 such as that shown in FIG. 8F. Such a technique and structure design may include an absorption component such as the terminator the end of a channel, as shown in FIGS. 6A and 6B, or the absorption component of FIG. 5E. By adjusting the size, shape, and location of the coupling aperture 872, the desired taper profile may be achieved. Further, two adjacent waveguides, each located in a different split block section may couple to ramp section 882 to form a single waveguide. The single waveguide after the ramp section may be located in the common plane of the split-block assembly.

It should be understood that other shapes and dimensions of the waveguide channels, portions of the waveguide channels, sides of the waveguide channels, wave-directing members, and the like are possible as well. In some embodiments, a rectangular shape of waveguide channels may be highly convenient to manufacture, though other methods known or not yet known may be implemented to manufacture waveguide channels with equal or even greater convenience.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A radar system comprising:
   a split-block assembly comprising a first portion and second portion, wherein the first portion and the second portion form a seam, wherein the first portion has a top side opposite the seam and the second portion has a bottom side opposite the seam;
   a plurality of ports located on a bottom side of the second portion;
   a plurality of radiating elements located on a top side of the first portion, wherein:
      the plurality of radiating elements is arranged in a plurality of arrays, and
      the plurality of arrays comprises:
         a set of multiple-input multiple-output (MIMO) transmission arrays,
         a set of synthetic aperture radar (SAR) transmission arrays, and
         at least one reception array, and;
   a set of waveguides in the split-block assembly configured to couple each array to a port.

2. The radar system according to claim 1, further comprising a circuit board coupled to the bottom side of the second portion.

3. The radar system according to claim 2, wherein the circuit board is configured to provide an electromagnetic signal to at least one of the plurality of ports.

4. The radar system according to claim 2, wherein the circuit board is configured to receive an electromagnetic signal from at least one of the plurality of ports.

5. The radar system according to claim 1, wherein the at least one reception array comprises:
   a SAR reception array; and
   a uniform linear array.

6. The radar system according to claim 5, wherein the SAR reception array is a six by ten array and the uniform linear array is a sixteen by ten array.

7. The radar system according to claim 5, wherein at least one of the uniform linear array and the SAR reception array has an electronically scanned beam.

8. The radar system according to claim 1, wherein the set of SAR transmission arrays comprises four arrays.

9. The radar system according to claim 7, wherein each SAR transmission array is a six by ten array.

10. The radar system according to claim 1, wherein the set of MIMO transmission arrays comprises four arrays.

11. The radar system according to claim 7, wherein each MIMO transmission array is a six by ten array.

12. The radar system according to claim 1, wherein at least a portion of the set of waveguides have the seam at the center of the height of the waveguides.

13. The radar system according to claim 3, wherein at least one waveguide has an edge located at the seam.

14. The radar system according to claim 1, wherein at least one of the ports has dimensions based on impedance matching between a waveguide coupled to the port and a coupling component coupled to the port.

15. The radar system according to claim 1, wherein the set of waveguides includes a plurality of waveguides having edges located at the seam of the split-block assembly, wherein each edge is adjacent to an edge of another waveguide in the plurality of waveguides.

16. The radar system according to claim 1, wherein each array comprises a plurality of radiating elements and a subset of the radiating elements of each respective array is coupled to a feed waveguide, and wherein the feed waveguide has a waveguide feed that is located between two radiating elements coupled to the feed waveguide.

17. The radar system according to claim 1, wherein each MIMO transmission array has a beam width of approximately 90 degrees and each SAR transmission array has a beam width of approximately 45 degrees pointed at 22.5 degrees.

18. The radar system according to claim 1, wherein the waveguides form a reactive beamforming network.

19. An antenna configuration for a vehicle-mounted radar system comprising:
- four multiple-output (MIMO) transmission antenna arrays, wherein each MIMO array is configured as a six by ten array;
- four synthetic aperture radar arrays (SAR) transmission antenna arrays, wherein each SAR array is configured as a six by ten array;
- a SAR reception array configured as a six by ten array; and
- a uniform linear array configured as a sixteen by ten array.

20. A vehicle-mounted radar system comprising:
- four multiple-output (MIMO) transmission antenna arrays, wherein each MIMO array has a beam width of approximately 90 degrees;
- four synthetic aperture radar arrays (SAR) transmission antenna arrays, wherein each SAR array has a beam width of approximately 45 degrees;
- a SAR reception array having an electronically steerable beam; and
- a uniform linear array having an electronically steerable beam.

* * * * *